(12) United States Patent
Roberts et al.

(10) Patent No.: US 8,975,829 B2
(45) Date of Patent: *Mar. 10, 2015

(54) RF INDUCTION LAMP WITH ISOLATION SYSTEM FOR AIR-CORE POWER COUPLER

(71) Applicant: Lucidity Lights, Inc., Cambridge, MA (US)

(72) Inventors: Victor D. Roberts, Burnt Hills, NY (US); John R. Gocsha, Boston, MA (US)

(73) Assignee: Lucidity Lights, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,560

(22) Filed: May 21, 2013

(65) Prior Publication Data

US 2014/0320005 A1    Oct. 30, 2014

Related U.S. Application Data

(63) Continuation-in-part of application No. 13/870,022, filed on Apr. 25, 2013.

(51) Int. Cl.
    *H05B 37/02*    (2006.01)
    *H01J 65/04*    (2006.01)

(52) U.S. Cl.
    CPC .................................. *H01J 65/048* (2013.01)
    USPC .......................................... 315/291; 315/224

(58) Field of Classification Search
    USPC .............. 315/209 R, 224, 225, 291, 307, 308
    See application file for complete search history.

(56) References Cited

U.S. PATENT DOCUMENTS

| | | | |
|---|---|---|---|
| 4,559,478 A | * | 12/1985 | Fuller et al. ................... 315/224 |
| 4,710,678 A | | 12/1987 | Houkes et al. |

(Continued)

FOREIGN PATENT DOCUMENTS

| | | |
|---|---|---|
| EP | 1705691 A1 | 9/2006 |
| EP | 2421335 A1 | 2/2012 |
| JP | 2006054054 A | 2/2006 |
| JP | 2009104981 A | 5/2009 |
| WO | 2014082039 A1 | 5/2014 |

OTHER PUBLICATIONS

U.S. Appl. No. 13/870,022, filed Apr. 25, 2013.*

(Continued)

*Primary Examiner* — Jimmy Vu

(74) *Attorney, Agent, or Firm* — GTC Law Group LLP & Affiliates

(57) ABSTRACT

An induction RF fluorescent lamp includes a lamp envelope with a re-entrant cavity both covered on a partial vacuum side with phosphor and filled with a working gas mixture; an air-core power coupler on the non-vacuum side of said re-entrant cavity comprising a coil composed of at least one turn of an electrical conductor; an electronic ballast, wherein the ballast converts mains frequency voltage and current to a power coupler frequency voltage and current, the electronic ballast providing the voltage and current to the power coupler through at least two of a plurality of electrical terminals of the electronic ballast; and a capacitor electrically connected between the air-core power coupler and at least one of the plurality of electrical terminals of the electronic ballast, wherein the magnitude of the impedance of the capacitor is high at the mains frequency and the magnitude of the impedance of that same capacitor is low at the operating frequency of the RF fluorescent lamp.

12 Claims, 20 Drawing Sheets

(56) References Cited

U.S. PATENT DOCUMENTS

| | | |
|---|---|---|
| D443,703 S | 6/2001 | Sood |
| D506,840 S | 6/2005 | Ven et al. |
| 7,049,763 B2 | 5/2006 | Hochi et al. |
| D528,674 S | 9/2006 | Gonzalez |
| 7,119,486 B2 | 10/2006 | Godyak et al. |
| 7,180,230 B2 | 2/2007 | Godyak et al. |
| D538,953 S | 3/2007 | Mama |
| D540,961 S | 4/2007 | Hrubowchak et al. |
| D550,864 S | 9/2007 | Hernandez, Jr. et al. |
| 8,698,413 B1 | 4/2014 | Godyak et al. |
| 2005/0280344 A1 | 12/2005 | Godyak et al. |
| 2014/0145621 A1 | 5/2014 | Goscha et al. |

OTHER PUBLICATIONS

PCT/US2013/071709, International Application Serial No. PCT/US2013/071709, International Search Report and Written Opinion mailed Mar. 26, 2014, Lucidity Lights, Inc., 22 pages.

"GE 82137-5 60-Watt Reveal with Halogen Long Life A19 Light Bulb", Amazon.com, http://www.amazon.com/gp/product/images/B00328GSVM/ref=dp_image_z_0?ie=UTF8&n=228013&s=hi, (accessed Aug. 26, 2014), 1 page.

M9711465-0001, "DE Design Application No. M9711465-0001, titled "Fluorescent lamp", filed Dec. 11, 1997", Toshiba Lightec KK, and as shown on p. 3457 in the German Design Gazette that issued on Sep. 10, 1998, Sep. 10, 1998, 5 pages.

* cited by examiner

RF INDUCTION LAMP WITH ISOLATION SYSTEM FOR AIR-CORE POWER COUPLER

CROSS-REFERENCE TO RELATED APPLICATIONS

This application is a continuation-in-part of the following U.S. patent application, which is hereby incorporated by reference in its entirety: U.S. patent application Ser. No. 13/870,022 filed Apr. 25, 2013.

BACKGROUND

1. Field

The present invention generally relates to induction lamps, and more specifically to reducing a shock hazard associated with such lamps.

2. Description of Related Art

Discharge lamps create light by exciting an electrical discharge in a gas and using that discharge to create visible light in various ways. In the case of fluorescent lamps the gas is typically a mixture of argon, krypton and/or neon, plus a small amount of mercury. Other types of discharge lamps may use other gasses. The gas is contained in a partially evacuated transparent virtuous envelope called a bulb or arc tube depending upon the type of lamp.

In conventional lamps electrically conductive electrodes mounted inside the bulb or arc tube along with the gas provide the electric field used to drive the discharge.

Use of electrodes creates certain problems. First, the discharge has to be designed to have a relatively high voltage in order to minimize loses at the electrodes. In the case of fluorescent lamps, this leads to long, thin lamps, which are ideal for lighting office ceilings, but are not a good fit for lamps designed to replace conventional incandescent lamps. Fluorescent lamps designed to replace incandescent lamps, known as compact fluorescent lamps, or CFLs, are typically constructed by bending the long, thin tube into multiple parallel tubes or into a spiral, which is now the most common form of CFLs. A plastic cover shaped like a conventional incandescent lamp is sometimes placed over the bent tubes to provide a more attractive shape, but these covers absorb light, making the lamp less efficient. Bent and spiral tube lamps also have wasted space between the tubes, making them larger than necessary. The use of a cover increases the size further.

The use of electrodes creates problems other than shape and size. Electrodes will wear out quickly if the lamp is turned on and off many times, as it would be in a residential bathroom and similar applications. The life of the electrodes can also be reduced if the lamp is dimmed, because the electrodes must be maintained in a specific temperature range for proper operation and operation at lower power allows the electrodes to cool.

In addition, the long thin shape required to use electrodes increases the time required for mercury vapor to diffuse from one part of the tube to another, leading to the long warm-up times associated with many compact fluorescent lamps.

Finally, the electrodes must be chemically compatible with the gas used in the lamp. While this is not a concern with typical fluorescent lamps, it can be a problem with other types of discharge lamps.

The best way to avoid the problems caused by electrodes is to make a lamp that does not use electrodes, a so-called electrodeless lamp. In an electrodeless lamp, the discharge is driven by one of 1) an electric filed created by electrodes mounted outside the bulb or arc tube; or 2) an electric filed created by a very high frequency electromagnetic field, usually in combination with a resonant cavity, and 3) an electric field created by a high frequency magnetic field without the use of a resonant cavity. This latter lamp is called an induction-coupled electrodeless lamp, or just "induction lamp."

In an induction lamp, a high frequency magnetic field is used to create the electric field in the lamp, eliminating the need for electrodes. This electric field then powers the discharge.

Since induction lamps do not use electrodes, they do not have to be built into long thin tubes. In fact, a ball-shaped bulb, such as the bulb used for conventional incandescent lamps, is an ideal shape for an induction lamp. In addition, since induction lamps do not use electrodes, they can be turned on and off frequently with no loss of life. The absence of electrodes also means that induction lamps can be dimmed with no reduction in lamp life. Finally, the ball-shaped lamp envelope allows rapid diffusion of mercury vapor from one part of the lamp to another. This means that the warm-up time of induction lamps is faster than the warm-up time of most conventional compact fluorescent lamps.

Induction lamps fall into two general categories, those that use a "closed" magnetic core, usually in the shape of a torus, and those that use an "open" magnetic core, usually in the shape of a rod. Air core induction lamps fall into this latter category. Closed core lamps can be operated at frequencies generally above 50 kHz, while open core lamps require operating frequencies of 1 MHz and above for efficient operation. The lower operating frequency of closed core induction lamps makes them attractive; however, the bulb design required to accommodate the closed core makes them generally unsuitable for replacing standard in incandescent lamps. Open core induction lamps, while requiring higher operating frequencies, allow the design of lamps that have the same shape and size as common household incandescent lamps. This application is addressed to open core induction lamps.

In spite of their obvious advantages, there are very few open core induction lamps on the market today. One reason for the lack of commercially successful products is the cost of the high frequency ballast. Conventional fluorescent lamps, including CFLs, can be operated at frequencies from 25 kHz to 100 kHz, a frequency range where low cost ballast technology was developed in the 1990s'; and closed core induction lamps can be operated at frequencies from 50 kHz to 250 kHz, for which the ballasts are only slightly more expensive. However, open core induction lamps require operating frequencies of 1 MHz or higher. The United States Federal Communications Commission (FCC) has established a "lamp band" between 2.51 MHz and 3.0 MHz that has relaxed limits on the emission of radio frequency energy that may interfere with radio communication services. Cost effective open core induction lamps should therefore have an operating frequency of at least 2.51 MHz.

The lack of commercially successful open core induction lamps can be traced to the failure to develop a low cost ballast that can operate in the 2.51 MHz to 3.0 MHz band while meeting all the requirements of the FCC, is small enough to fit into a lamp and ballast housing that has the same size and shape as a conventional incandescent lamp, and can be dimmed on conventional TRIAC dimmers found in homes in the U.S. The present disclosure addresses one or more of these issues.

Passive Valley Fill Circuits are widely used in front end power supplies of electronic ballasts for power factor (PF) correction and reduction of total harmonic distortion (THD). The advantages of these front end power supplies include their low cost, high efficiency and simplicity, features that are desirable for low power compact fluorescent lamps (CFLs).

However, the PF of electronic ballasts with Passive Valley Fill Circuits is still lower and THD is higher than electronic ballasts that employ active power factor correctors utilizing boost converters. Electronic ballasts with Passive Valley Fill power factor circuits are used in high efficiency lamps intended to replace incandescent lamps in applications where those lamps are powered and dimmed by TRIAC-based wall dimmers. For operation with TRIAC-based wall dimmers it is desirable to have sufficient discharge capacitance in the Passive Valley Fill circuit in order to maintain the gas discharge in the lamp during line current interruptions. It is also understood that the power factor is improved and the dimming range may be extended as the minimum voltage of the Passive Valley Fill circuit is reduced. Therefore, room still exists for improvements in electronic ballasts with Passive Valley Fill circuits.

SUMMARY

In accordance with exemplary and non-limiting embodiments, systems and methods for the configuration and operation of an electrodeless lamp, also referred to as an induction lamp, are provided.

In embodiments, it may be desirable to connect the power coupler of the induction lamp to RF ground through a capacitor that has low impedance at the operating frequency of the lamp, but high impedance at the frequency of the AC power line. This would prevent electrical shock if a human came in contact with the coupler while the lamp was connected to an AC power line, even if the high frequency converter in the ballast was not operating.

In embodiments, an induction RF fluorescent lamp may include a lamp envelope with a re-entrant cavity both covered on a partial vacuum side with phosphor and filled with a working gas mixture; an air-core power coupler on the non-vacuum side of said re-entrant cavity comprising a coil composed of at least one turn of an electrical conductor; an electronic ballast, wherein the ballast converts mains frequency voltage and current to a power coupler frequency voltage and current, the electronic ballast providing the voltage and current to the power coupler through at least two of a plurality of electrical terminals of the electronic ballast; and a capacitor electrically connected between the air-core power coupler and at least one of the plurality of electrical terminals of the electronic ballast, wherein the magnitude of the impedance of the capacitor is high at the mains frequency and the magnitude of the impedance of that same capacitor is low at the operating frequency of the RF fluorescent lamp. In embodiments, the connection of the capacitor between the air-core power coupler and the at least one of the plurality of electrical terminals of the electric ballast may be between a first location on the coil (e.g. a first end of the coil) of the air-core power coupler and at least one of the plurality of electrical terminals of the electronic ballast. Further, there may be second capacitor, where the second capacitor is electrically connected between a second location on the coil of the air-core power coupler and a second of the plurality of electrical terminals of the electronic ballast, wherein the magnitude of the impedance of the second capacitor is high at the mains frequency and the magnitude of the impedance of that same second capacitor is low at the operating frequency of the RF fluorescent lamp. The electrical terminals may be a common or reference for the electronic ballast, a DC bus for the electronic ballast, and the like. The presence of the capacitor may reduce the risk of electrical shock when a person has direct contact with the air-core power coupler. The lamp may be electrically connected to mains power without electrical isolation. The electrical conductor is at least one of an electrically conductive wire and electrically conductive strip. Without limitation, the low magnitude for the impedance of the capacitor at the operating frequency of the RF fluorescent lamp may be equal to or less than 100 ohms, the operating frequency of the RF fluorescent lamp may be in the range 1 MHz to 1 GHz, the mains frequency may be in the range of 50 Hz to 60 Hz, and the value of the capacitor may be in the range of 60 pF to 13 nF at a mains frequency of 60 Hz and a ballast operating frequency of 27.65 MHz.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While described in connection with certain exemplary and non-limiting embodiments, other exemplary embodiments would be understood by one of ordinary skill in the art and are encompassed herein. It is therefore understood that, as used herein, all references to an "embodiment" or "embodiments" refer to an exemplary and non-limiting embodiment or embodiments, respectively.

DETAILED DESCRIPTION

An induction-driven electrodeless discharge lamp, here after referred to as an 'induction lamp', excites a gas within a lamp envelope through an electric field created by a time-varying magnetic field rather than through electrically conductive connections (such as electrodes) that physically protrude into the envelope. Since the electrodes are a limiting factor in the life of a lamp, eliminating them potentially extends the life that may be expected from the light source. In addition, because there are no metallic electrodes within the envelope, the burner design may employ higher efficiency materials that would otherwise react with the electrodes. Embodiments described herein disclose an inductor mounted inside a re-entrant cavity protruding upward within the burner envelope, where the inductor is at least one coil, which may be wound around a core of magnetizable material suitable for operation at the frequency of the time-varying magnetic field, such as ferrite or iron powder, to form the power coupler that creates the time-varying magnetic field that generates the time-varying electric field in the lamp's interior. The power coupler receives electrical power from a high-frequency power supply, known as a ballast, which in embodiments is integrated within the base of the induction lamp. The ballast in turn receives electrical power through a standard base, such as an Edison Screw Base (E39, E26, E17 or E12 base), a GU-24 base, and the like, from the AC mains. The form factor for the induction lamp may take a form similar to a standard incandescent light bulb, (A19 shape) or an incandescent reflector lamp, such as an R30 or BR30, thus allowing it to be used as a replacement for incandescent light bulbs.

Figure 1:
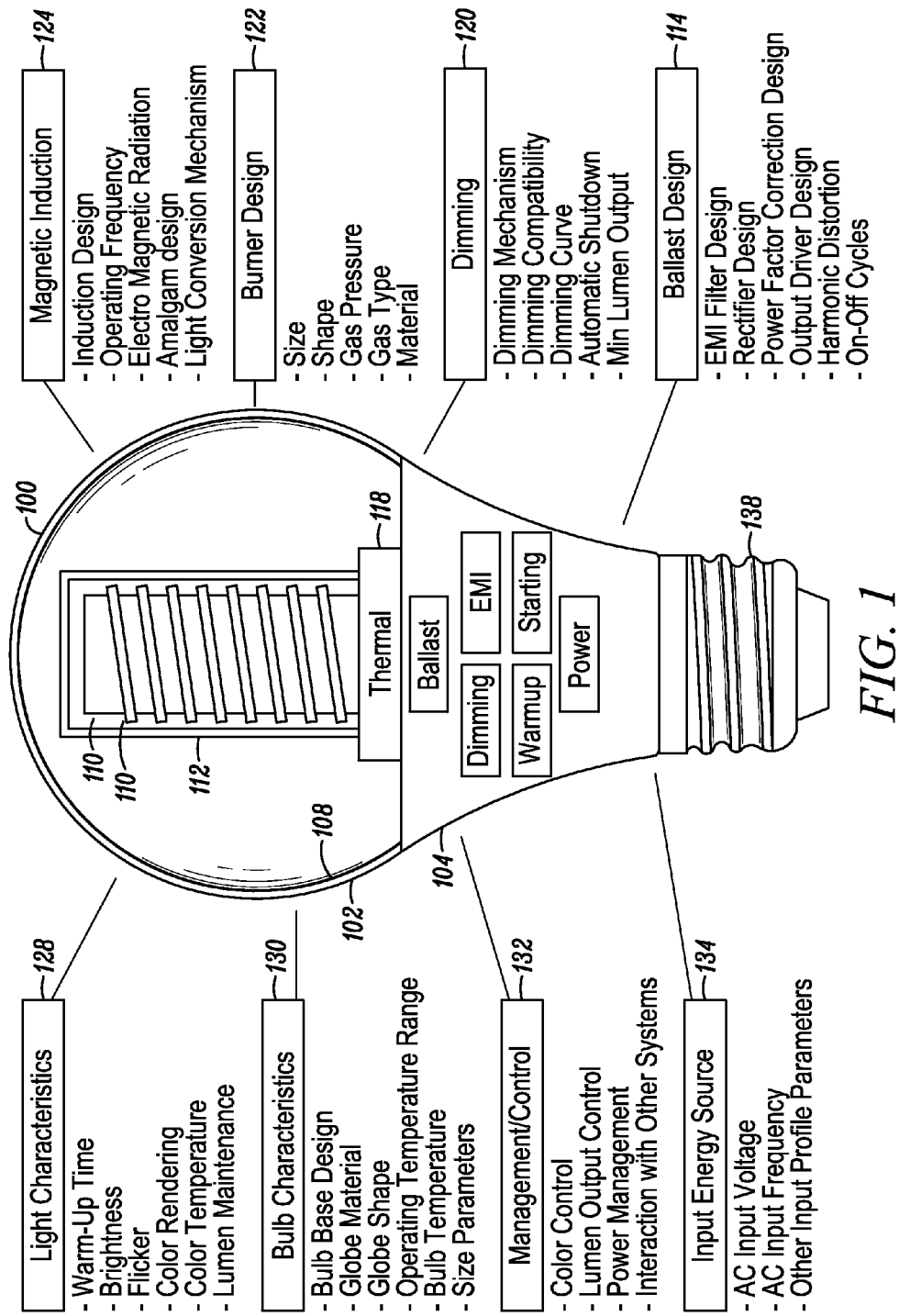
FIG. 1 depicts a high-level functional block diagram of an embodiment of the induction lamp.

Referring to FIG. 1, an embodiment of an induction lamp 100 is illustrated, having an 'upper' light providing portion 102 (i.e., the light production end, understanding that the lamp may be mounted in any orientation per the lamp socket position), a 'lower' electronics portion 104 (i.e. the opposite of the light production end), and an electrical-mechanical base connection (e.g. an Edison base), where the proportions and shape of the upper and lower portions of the induction lamp are illustrative, and not meant to be limiting in any way. In embodiments, the upper portion may include the burner envelop 108 with an induction power coupler 110 (comprising winding(s), and optionally a core as described herein) inserted up into a re-entrant cavity 112, where the induction power coupler creates the time-varying magnetic field that, in turn, creates the time-varying electric field within the burner envelop. The burner envelop contains an amalgam that provides mercury vapor. The mercury atoms in the vapor are then both ionized and excited by the time-varying electric field. The excited mercury atoms emit small amounts of visible light plus much larger amounts of ultraviolet energy that is then converted into visible light by a phosphor coating on the inside of the burner envelope, thus the induction lamp provides light to the outside environment. In embodiments, the external appearance of the upper portion with respect to its optical properties may be similar to traditional phosphor-based lighting devices, where the glass is substantially white due to the phosphor coating on the inside of the envelope. The external appearance of the lower portion with respect to its optical properties may be made to be substantially similar to the upper portion in order to minimize the differences in the appearance of the upper and lower portions, thus minimizing the overall visual differences between the external appearance of the disclosed induction lamp bulb and that of a traditional incandescent bulb. In embodiments, the induction lamp may include other aspects that contribute to acceptance and compatibility with existing incandescent lighting, such as with dimming compatibility to existing external circuitry (e.g. dimming switches that employ TRIAC or MOSFET switches) and lighting characteristics similar to an incandescent lamp (e.g. brightness level, low flicker, matching color rendering, matching color temperature, and the like). In this way, the induction lamp will substantially resemble a traditional incandescent light bulb, increasing the sense of familiarity of the new induction lamp with the public through association with the incandescent lamp, and thus helping to gain acceptance and greater use for replacement of incandescent light sources.

The induction lamp described in embodiments herein may provide for improved capabilities associated with the design, operation, and fabrication of an induction lamp, including in association with the ballast 114, thermal design 118, dimming 120, burner 122, magnetic induction 124, lighting characteristics 128, bulb characteristics 130, management and control 132, input energy 134, and the like. The ballast, as located in the lower portion of the induction lamp, is the high-frequency power supply that takes mains AC as provided through the base 138, and creates the high-frequency electrical power delivered to the power coupler located in the re-entrant cavity in the upper portion. Improved capabilities associated with the ballast design may include dimming facilities, EMI filter, a rectifier, a power factor correction facility, output driver, circuitry with reduced harmonic distortion, a power savings mode with on-off cycles, lamp start-up, lamp warm-up, power management, and the like. Improved capabilities may provide for a design that provides a compatible thermal environment, such as through a static thermal design, through dynamic power management, and the like.

Improved capabilities associated with the dimming design may include a dimming mechanism, dimming compatibility, a compatible dimming performance relative to a dimming curve, an automatic shutdown circuit, a minimum lumen output, and the like. Dimming capabilities may include methods for dimming and/or TRIAC trigger and holding currents, including frequency dimming, frequency dimming and handshake with TRIAC firing angle, circuits without a traditional smoothing capacitor and with an auxiliary power supply, burst mode dimming, multiple-capacitor off-cycle valley filling circuit, frequency slewing, auto shut-off dimming circuit, current pass-through, utilization of bipolar transistor, holding current pulsed resistor, charge pump, buck or boost converter, and the like.

Improved capabilities associated with the burner design may include aspects related to the size, shape, gas pressure, gas type, materials, EMI reduction via core and/or coupler shielding, methods to reduce light output run-up time, improved lumen maintenance through improved burner processing, use of protective coatings on burner surfaces or improved materials for fabricating the burner envelope and reentrant cavity, and the like.

Improved capabilities associated with the magnetic induction design may include the operating frequency range, electro-magnetic radiation management, reduced electro-magnetic interference utilizing active and passive magnetic induction windings, improved axial alignment through radial spacers, or a grounded shell inserted to the ferromagnetic core, internal transparent conductive coatings, external transparent conductive coating with insulating overcoat, electrical field shield between the coupler and the re-entrant cavity, and the like.

Improved light characteristics provided may include warm-up time, brightness, luminous flux (lumens), flicker, color rendering index, color temperature, lumen maintenance, incandescent-like lighting in a magnetic induction electrodeless lamp, high red rendering index lighting, increased R9, and the like.

Improved lamp characteristics provided may include a bulb base design, globe material, globe shape operating temperature range, bulb temperature, size parameters, instant on electrodeless lamp for residential applications, electrodeless lamp for frequent on/off and motion detector applications, and the like.

Improved capabilities associated with the management and control may include color control, lumen output control, power management, susceptibility to line voltage changes, component variations and/or temperature changes, interaction with other systems, remote control operation (e.g. activation, deactivation, dimming, color rendering), and the like.

Improved capabilities associated with the input source may include AC input voltage, AC input frequency, and other input profile parameters.

Ballast

The ballast is a special power supply that converts power line voltage and current to the voltage and current required to operate the burner. In the U.S. the ballast generally operates from a 120 Volt, 60 Hz AC power line, but the ballast could be designed to operate from AC power lines with different voltages and/or frequencies, or from DC power lines with a range of voltages. Ballasts that are designed for induction-driven electrodeless discharge lamps convert the power line voltage and current into voltage and current with a frequency in the range of 50 kHz to 50 GHz, depending upon the design of the lamp. For the type of induction lamps described in the present disclosure, the ballast output frequency is generally in the 1 MHz to 30 MHz region.

The ballast provides a number of functions in addition to the basic frequency, voltage and current conversion functions. The other key functions include: a) providing a means to generate the high voltages necessary to start the discharge; b) limiting the current that can be delivered to the discharge, and c) reducing the power delivered to the discharge to reduce the light produced when commanded to do so by a user-operated control, i.e., a dimmer.

The conversion from power line voltages and currents to the voltages and currents used to operate the discharge are usually accomplished in a two-step process. In the first step, the power line voltage and current is converted into DC voltage, usually by means of a full wave bridge rectifier and optionally an energy storage capacitor. In the second step, the DC power created by the bridge rectifier is converted into high frequency AC power at the desired frequency by means of an inverter. The most common inverter used in discharge lamp ballasts is a half-bridge inverter. Half-bridge inverters are composed of two switches, usually semiconductor switches, connected in series across the DC power bus. The output terminals of the half-bridge inverter are 1) the junction between the two switches, and 2) either side of the DC power bus for the inverter. The half-bridge inverter may be driven by feedback from the matching network described herein or a separate drive circuit. The former is called a "self-oscillating half-bridge inverter" while the latter would be called a "driven half-bridge inverter."

In addition to half-bridge inverters, the inverter can be configured as a push-pull circuit using two switches, or as a flyback or Class E or other such converter using a single switch.

The switch or switches used for the inverter can be composed of bi-polar transistors, Field Effect Transistors (FETs), or other types of semiconductor switching elements such as TRIACs or Insulated Gate Bi-Polar Transistors (IGBTs), or they can even be composed of vacuum tubes. Ballasts designed for induction lamps generally employ FETs in the inverter.

The output voltage of a half-bridge inverter is typically composed of both DC and AC components. Therefore, at least one DC blocking capacitor is typically connected in series with the induction lamp load when it is connected to the half-bridge inverter. Additionally a matching network is connected between the output of the half-bridge inverter and the induction-driven lamp load. The matching network provides at least the following four functions: 1) convert the input impedance of the coupler described herein to an impedance that can be efficiently driven by the half-bridge inverter, 2) provide a resonant circuit that can be used to generate the high voltages necessary to initiate the discharge in the burner, 3) provide the current-limiting function that is required by the fact that the discharge has what is known as "negative incremental impedance" which would cause it to draw high levels of current from the half-bridge inverter if that current was not limited by some means, and 4) filter the waveform of the half-bridge inverter, which is generally a square wave, to extract the sine wave at the fundamental frequency of the half-bridge inverter. This last step is necessary to reduce generation by the coupler and burner of electromagnetic radiation at harmonics of the fundamental drive frequency of the half-bridge inverter.

The matching network is typically composed of a resonant circuit that is used to generate high voltage to start the discharge in the burner and then provides the current limiting function after the discharge has been initiated. This resonant circuit is often designed as a series resonant L-C circuit with the lamp connected across the resonant capacitor. However, other configurations are possible. The coupler used with induction lamps is inductive, so the matching network for an induction lamp could be a series C-L with the discharge "connected" across the inductor by virtue of the inductive coupling inherent in such lamps. However, better performance is often achieved with an L-C-L circuit that uses the inductance of the coupler in addition to a separate inductor and capacitor. Other matching networks that employ additional inductors and/or capacitors are known in the art.

Since the half-bridge inverter is operating at a frequency substantially above the power line frequency, it is also generally equipped with what is known as an "EMI filter" where it is connected to the power line. The EMI filter is designed to reduce the level of high frequency noise that the half-bridge inverter injects into the AC power line. To achieve this function, the EMI filter is generally designed as a low pass filter with a cut-off frequency below the operating frequency of the inverter.

Ballasts that employ the basic AC-to-DC converter stage described herein, consisting of a full wave bridge rectifier and an energy storage capacitor, will usually draw current from the AC power line only near the peak of the AC voltage waveform. This leads to what is known as "low power factor" and "high total harmonic distortion." Low power factor and high harmonic distortion are not serious issues for many consumer applications, but would create problems in commercial and industrial applications. Low power factor is also undesirable in consumer applications if the ballast is to be used on a circuit controlled by a TRIAC-based incandescent lamp dimmer.

The TRIACs used in conventional lamp dimmers expect the lamp load to draw current during all parts of the power line cycle. This current is used by the dimmer to charge the TRIAC firing circuits at the start of the each power line half-cycle, and to maintain the TRIAC in the "on" state until the voltage drops to zero before changing polarity every half-cycle. A conventional low power factor circuit draws current only during a small part of the power line cycle; the part of the cycle when the power line voltage is near its peak value. TRIAC-based dimmers therefore do not work properly when driving ordinary low power factor ballasts.

Ballasts can be modified in at least the following five ways to make them compatible with TRIAC-based dimmers:

In embodiments, a special "active power factor correction" circuit can be added to the ballast. This is typically a separate power conversion stage such as a buck or boost converter that is designed to draw current from the AC power line over essentially the full AC cycle. The current drawn generally has a sinusoidal wave shape.

In embodiments, a "charge pump" circuit can be used to feed some of the energy from the output of the ballast back to the input, and use this energy to draw small amounts of current from the AC power line at the frequency of the high frequency inverter. Charge pump circuits can create a sinusoidal input current, like that produced by an active power factor correction stage, or they can draw smaller currents that are not high enough to create a sinusoidal current input but are still high enough to provide TRIAC trigger and holding current.

In embodiments, the single energy storage capacitor may be replaced with two or more energy storage capacitors connected in such a way that they charge in series but discharge in parallel. These so-called "passive valley fill" circuits will draw current over a greater portion of the AC cycle than a single power line frequency energy storage capacitor, leading to improved power factor and lower total harmonic distortion.

In embodiments, the energy storage capacitor can be removed completely, or separated from the output of the full wave bridge rectifier, so that the circuit naturally draws power over most of the AC cycle. This type of circuit may benefit from the addition of an auxiliary power supply that can provide enough power keep the lamp operating when the power line voltage drops to a low value as it changes polarity twice each cycle.

In embodiments, an impedance element, such as a resistor or capacitor can be connected to the output of the full wave bridge so that some current is drawn from the AC power line over the full AC cycle, even when the remainder of the ballast is using power stored in the energy storage capacitor and not drawing current from the AC power line. Further, the impedance element can be switched in and out of the circuit at a frequency higher than the power line frequency, or have its value adjusted by a control circuit so as to provide the required current load, while minimizing power loss.

Burner

The burner is constructed of a transparent or translucent vitreous material formed in the shape of the desired light emitting element. For the type of induction lamp described herein, an open cylindrical cavity, often referred to as a reentrant cavity, penetrates one side of the outer jacket of the burner. The inner surface of the burner and the surface on the partial vacuum side of the reentrant cavity are typically coated at least with a material called "phosphor" in the lamp industry that converts ultraviolet energy into visible light. The burner is evacuated and then filled with a rare gas, such as Neon, Argon or Krypton generally at a pressure of 25 Pascal to 250 Pascal. In addition, a small amount of mercury is added to the burner before it is sealed. The mercury is commonly combined with other metals, such as bismuth, indium or lead to form an amalgam that can be used to reduce the mercury vapor pressure at any specific temperature.

The outer bulb and reentrant cavity are generally made from glass, such as soda lime glass or borosilicate glass.

The mercury or mercury amalgam is generally placed in at least two locations in the burner. A "main" amalgam is generally placed in the coldest location in the burner, which is generally the sealed end of the exhaust tube. This mercury amalgam determines the mercury vapor pressure during steady state operation. Mercury or mercury amalgam is also generally placed on "flags" located in the main part of the burner cavity. The flag or flags are quickly heated by the discharge when said discharge is started and the flags therefore quickly release mercury vapor into the burner cavity to facilitate rapid ramp up of the light level to its steady state value.

The partial vacuum surface of the reentrant cavity may first be coated with a reflective material, such a magnesium oxide, before the phosphor is applied. Such reflective material reduces the amount of light lost to the air side of the reentrant cavity and thus increases the burner efficacy.

The partial vacuum surfaces of the burner may be optionally coated with a thin, transparent or translucent barrier layer that reduces chemical interactions between the phosphor and the glass. One such material is aluminum oxide.

The performance of the burner is a function of the dimensions of the outer bulb used to form the burner, the dimensions of the reentrant cavity, the pressure of the rare gas fill, the pressure of the mercury vapor (which is a function of the amalgam composition and the amalgam temperature), the quality of the phosphor, the thickness and particle size of the phosphor coating, the process used to burn the binder out of the phosphor, and the quality of the exhaust process.

Coupler

The coupler generates, through magnetic induction, the AC magnetic field that provides the electric field that drives the discharge. In addition, the voltage across the coupler is used to start the discharge through capacitive coupling.

The AC magnetic field created by the coupler changes in both intensity and polarity at a high frequency, generally between 50 kHz and 50 GHz. In the preferred embodiment, the coupler is a multi-turn coil of electrically conductive wire that is connected to output of the inverter. The AC current produced by the inverter flows through the coil and creates an AC magnetic field at the frequency of the inverter. The coil can optionally be wound on a "soft" magnetic material such as ferrite or iron powder that is chosen for its beneficial properties at the frequency of the AC current. When a soft magnetic material is used it can be formed in numerous shapes; such as a torus or a rod, or other shapes, depending upon the design of the burner. In the preferred embodiment, the coupler is formed from a coil of copper wire wound on a rod-like ferrite tube. The ferrite is tubular in that it has a hole along the axis to allow passage of the exhaust tube of the burner. For the preferred embodiment, the operating frequency is 1 to 10 MHz.

In another embodiment, the frequency is increased to the 10 MHz to 50 MHz range and the ferrite tube is removed and optionally replaced by a rod or tube made from a material that has a magnetic permeability essentially the same as that of free space, and an electrical conductivity of zero, or close to zero. One type of material that satisfies these conditions is plastic. Couplers wound on rods or tubes that satisfy the stated conditions are called 'air-core couplers' or 'air-core coils'. An air-core coil can also be fabricated without the use of any rod-like or tubular coil form if the wire is sufficiently stiff or if the wire is supported by an external structure. The use of an air-core coil may enable the printing of the coupler windings on the air side of the re-entrant, or removal of the reentrant and placement the air coil directly in the bulb with electrical feedthroughs to the outside, and the like.

The burner is designed to provide a discharge path that encircles the time-varying magnetic field. As is known from Faraday's Law of Induction, a voltage will be induced in any closed path that encircles a time varying magnetic field. That voltage will have the same frequency as the frequency of time-varying magnetic field. This is the voltage that drives the induction-coupled discharge.

The ferrite material is chosen for low power loss at the frequency of the AC current and at the magnetic flux density and temperature where it is designed to operate.

The number of turns on the coupler is chosen to provide a good impedance match for the inverter when connected through the matching network. It is generally desirable to have a coupler composed of at least 5 turns of wire to ensure efficient coupling to the discharge, while it is also desirable to have the turns form a single layer winding on the ferrite, if used, or form a single layer coil if an air core is used. These practical considerations set desirable lower and upper limits on the number of turns of the coil.

Management and Control

In embodiments, the induction lamp may include processor-based management and control facilities, such as with a microcontroller, a digital processor, embedded processor, microprocessor, digital logic, and the like. The methods and systems described herein may be deployed in part or in whole through a machine that executes computer software, program codes, and/or instructions on a processor, and implemented as a method on the machine, as a system or apparatus as part of or in relation to the machine, or as a computer program product embodied in a computer readable medium executing on one or more of the machines. The processor may be at least in part implemented in conjunction with or in communication with a server, client, network infrastructure (e.g. the Internet), mobile computing platform, stationary computing platform, cellular network infrastructure and associated mobile devices (e.g. cellular phone), or other computing platform.

Management and control facilities may receive inputs from external switches on the induction lamp, from IR/RF remote control inputs from remote controllers, and the like. For instance, an embedded controller may receive settings via switches mounted on the lower portion of the induction lamp, such as for color control, lumen output control, power savings modes, dimmer compatibility, and the like. In an example, there may be a switch setting to enable-disable dimming functionality, such as to provide a power savings as the result of disabling a dimming functionality. In another instance, a remote control may be used to control functions of the induction lamp, such as power management, light characteristics settings, dimming control, on-off control, networked control settings, timer functions, and the like. In an example, the induction lamp may be controlled through an RF remote control of the known art where the induction lamp includes an RF receiver interfaced to an embedded processor, where the RF remote controller controls lighting levels, such as on-off and dimming control. In another instance, a first induction lamp may be commanded directly by a remote controller, where the first induction lamp also acts as a repeater by sending the command on to at least one of a plurality of other induction lamps. In an example, a plurality of induction lamps may be controlled with a single remote control command, where induction lamps within range of the remote controller respond to the direct command, and where induction lamps not within direct range of the remote controller (such as because of distance, obstructions, and the like) are commanded by commands being repeated by induction lamps that had received the command (such as by any induction lamp repeating the command when received).

Management and control facilities may include a processor-based algorithm that provides at least partial autonomous management and control from parameters determined internal to the induction lamp, such as for color control, lumen output control, power management, and the like. For instance, lumen output control may be implemented at least in part by a processor-based algorithm where inputs to the processor may include feedback signals from the inverter output, and where inputs from the processor include control signals as an input to the inverter. In this way, the processor-based algorithm may at least in part replace analog feedback functionality, such as to provide greater control of the lumen output through internal algorithms utilizing data table mappings of inverter output current vs. luminous output, and the like. The algorithm may also accept control via commands to the induction lamp, such as from a switch setting, a remote control input, a command received from another induction lamp, and the like.

Thermal

In embodiments, the induction lamp may manage thermal dissipation within the structure, such as through a dynamic power management facility utilizing a processor-based control algorithm, through a closed-loop thermal control system, through thermal-mechanical structures, and the like. Indicators of thermal dissipation, such as temperature, current, and the like, may be monitored and adjusted to maintain a balance of power dissipated within the induction lamp such as to meet predetermined thermal requirements, including for maximizing the life of components within the induction lamp, maintaining safe levels of power dissipation for components and/or the system, maximizing energy efficiency of the system, adjusting system parameters for changes in the thermal profile of the system over a dimming range, and the like. In an example, power dissipation across a dimming range may create varying power dissipation in the system, and the dynamic power management facility may adjust power being dissipated by the ballast in order to maintain a maximum power requirement. In another example, maximum power dissipation for the system or components of the system may be maintained in order to maintain a life requirement for the system or components, such as for temperature sensitive components.

Electrical and Mechanical Connection

In embodiments, the electrical-mechanical connection of the induction lamp may be standard, such as the standard for incandescent lamps in general lighting, including an Edison screw in candelabra, intermediate, standard or mogul sizes, or double contact bayonet base, or other standards for lamp bases included in ANSI standard C81.67 and IEC standard 60061-1 for common commercial lamps. This mechanical commonality enables the induction lamp to be used as a replacement for incandescent bulbs. The induction lamp may operate at A.C. mains compatible with any of the global standards, such as 120V 60 Hz, 240V 50 Hz, and the like. In embodiments, the induction lamp may be alterable to be compatible with a plurality of standard AC mains standards, such as through an external switch setting, through an automatic voltage and/or frequency sensing, and the like, where automatic sensing may be enabled through any analog or digital means known to the art.

Dimming: Improved Dimming Circuits

Figure 2:
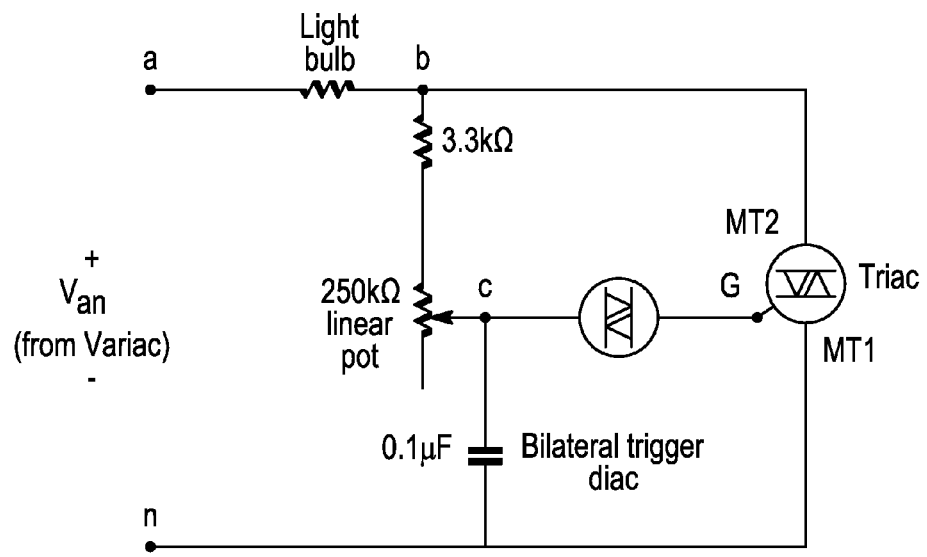
FIG. 2 shows a typical circuit diagram of a TRIAC based dimmer known in the art.

Phase controlled TRIAC dimmers are commonly used for dimming incandescent lamps. A TRIAC is a bidirectional gate controlled switch that may be incorporated in a wall dimmer. A typical dimmer circuit with an incandescent lamp is shown in FIG. 2, where the TRIAC turns "on" every half of the AC period. The turn "on" angle is determined by the position of the dimmer potentiometer and can vary in range from 0 to 180 degrees in the AC period. Typically the lighting dimmer is combined with a wall switch. An incandescent lamp is an ideal load for a TRIAC. It provides a sufficient latching and holding current for a stable turn "on" state. The TRIAC returns to its "off" state when the current drops below a specific "holding" current. This typically occurs slightly before the AC voltage zero crossing. But wall dimmers do not operate properly with most normal single stage ballasts. These ballasts are distinguished by front-end power supplies having a bridge rectifier with an electrolytic storage capacitor and without any additional so-called power factor correction circuits. Since the conduction angle of the bridge rectifier is very short in a conventional ballast that does not have any power factor correction circuitry, neither trigger current nor holding current are provided during the portion of the period when the rectifier is not conducting, and the TRIAC operation becomes unstable, which causes lamp flickering.

Besides holding and trigger currents, the TRIAC should be provided with latching current, that is a sufficient turn "on" current lasting at least 20-30 usec for latching the TRIAC's internal structure in a stable "on" state. A ballast circuit may have an RC series circuit connected across the ballast AC terminals to accommodate the TRIAC. But steady power losses in the resistor could be significant. Other references have similar principles of operation, such as based on drawing high frequency power from the bridge rectifier.

Figure 3:
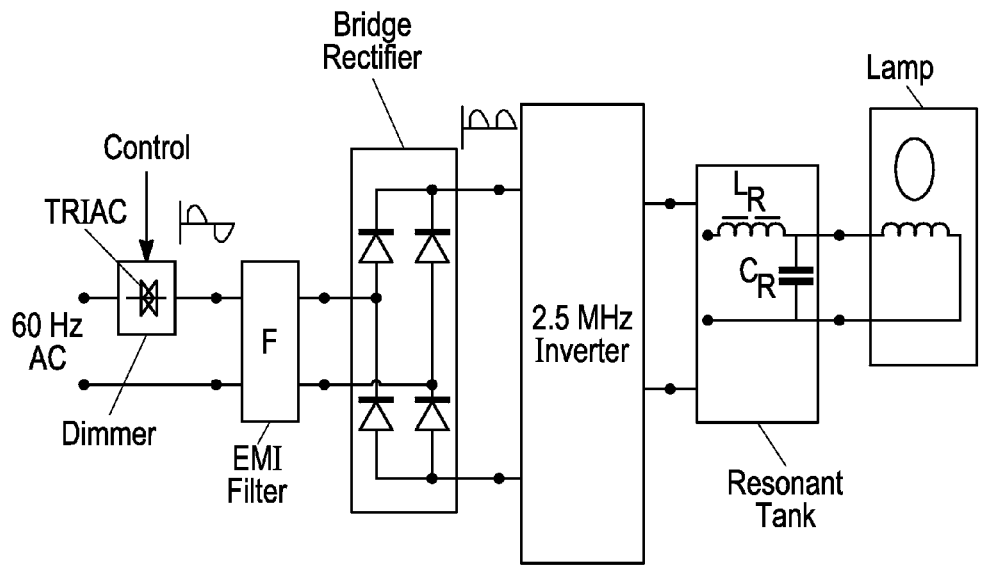
FIG. 3 shows a block diagram of an electronic ballast without an electrolytic smoothing capacitor known in the art.

Other previous work discloses a TRIAC dimmable electrodeless lamp without an electrolytic storage capacitor. In this case the ballast inverter input current is actually a holding current of the TRIAC and is high enough to accommodate any dimmer. The lamp ballast is built as self-oscillating inverter operating at 2.5 MHz. An example block diagram of a dimmable ballast is shown in FIG. 3. It comprises an EMI filter F connected in series with AC terminals, a Bridge Rectifier providing high ripple DC voltage to power a DC-to-AC resonant inverter, and a Resonant Tank loaded preferably by inductively coupled Lamp. The ballast inverter is preferably self-oscillating inverter operating in high frequency range (2.5-3.0 MHz). A TRIAC dimmer is connected in front of the ballast providing phase-cut control of the input AC voltage.

Figure 4:
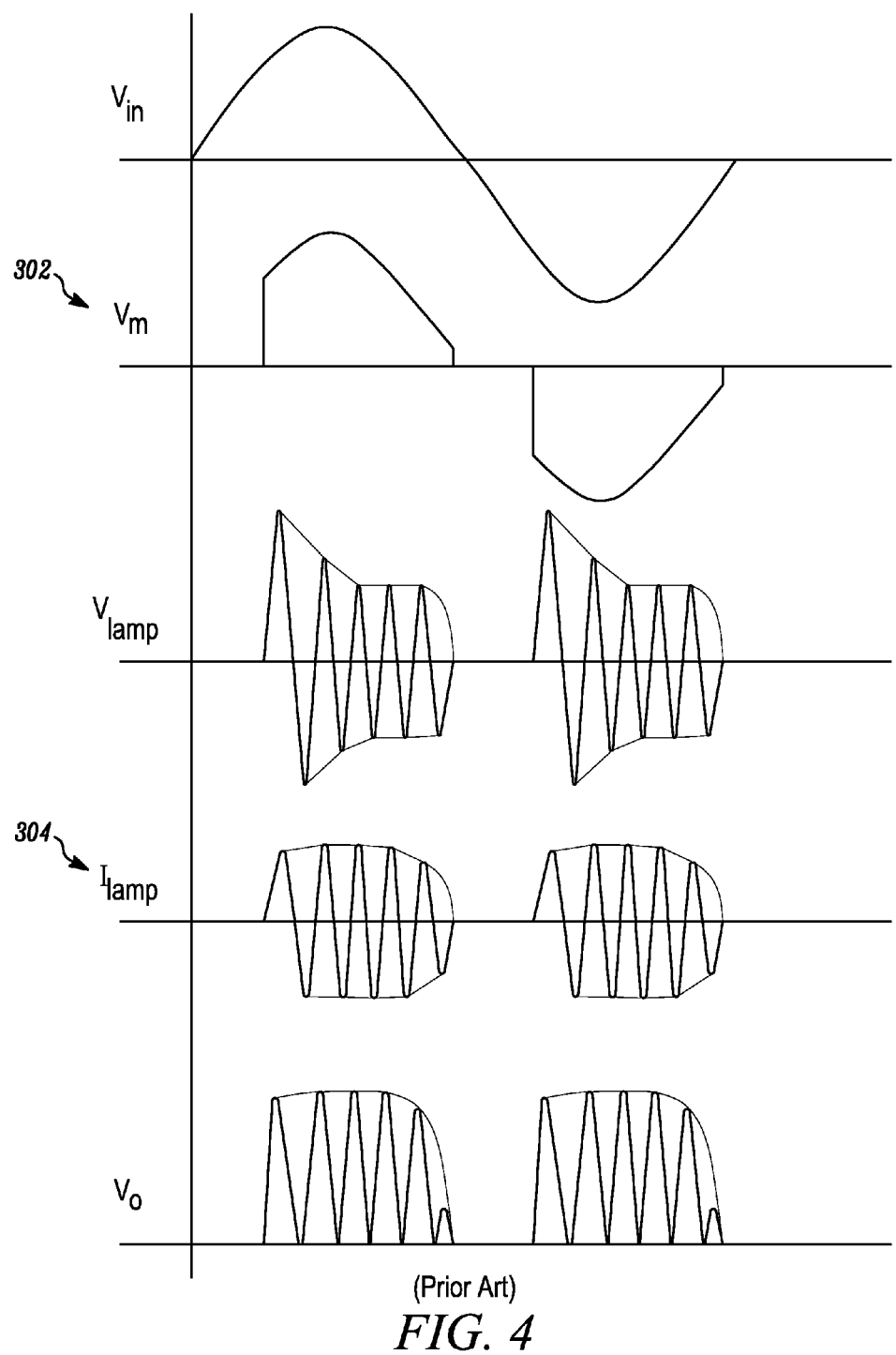
FIG. 4 illustrates dimming operation of the electronic ballast known in the art.

Related art teaches operation from a rectified AC line live voltage that varies from almost zero volts to about 160-170V peak. A self-oscillating inverter may start at some instant DC bus voltage, such as between 80V and 160V, but it will stop oscillating at lower voltage (usually in a range between 20V and 30V). FIG. 4 illustrates a related art dimming method where Vm (302) is a voltage waveform after the TRIAC dimmer. This voltage is rectified and applied to the input of the inverter. Without an electrolytic storage capacitor, the ballast inverter (not shown in FIG. 4) stops its operation during the TRIAC "off" intervals. Accordingly, the electrical discharge in the lamp burner stops and starts, such as illustrated in lamp current $I_{LAMP}$ (304) in FIG. 4.

Since the recombination time of the gas discharge in the lamp is much shorter than the TRIAC's "off" time, the lamp restarts every half period of the AC power line waveform with high starting voltage and power as at regular starting. Power consumption during starting interval of the ballast could be up to 80 W because of the high power losses in the coupler, and starting may damage the phosphor. Therefore, the dimming method illustrated in FIG. 3 may not be desirable because of stresses applied to both lamp and ballast.

Other related art discloses a TRIAC dimmed electronic ballast that utilizes a charge pump concept for an inductively coupled lamp. This method requires injecting RF power from the inverter into the full wave bridge rectifier used to convert the 60 Hz AC power into DC power. Accordingly, the 60 Hz bridge rectifier must be constructed using diodes that are rated for the full power line voltage and ballast input current, and are also fast enough to switch at the inverter frequency without excessive power loss. The design of charge pumps that work at the frequencies used for induction lamps is difficult and these circuits are currently unknown for frequencies above 200 kHz.

TRIAC dimmed electronic ballasts utilizing a charge pump require an electrolytic capacitor with the same voltage rating and with about the same size as that used in non-dimmable low power factor ballasts. A capacitor of this size can be a problem when the RF ballast is integrated in a lamp that has the same dimensions as a typical incandescent lamp. Due to the capacitor size issue, dimming ballasts that do not use electrolytic DC bus capacitor look attractive. However, the disadvantage related to restarting, mentioned above, makes that solution undesirable. Therefore, there is a need for other solutions for operating high frequency electrodeless lamps powered from TRIAC-based dimmers.

In accordance with an exemplary and non-limiting embodiment, a method for dimming a gas discharge lamp with a TRIAC-based wall dimmer is provided. The method may provide uninterruptible operation of the lamp and the ballast during TRIAC dimming. The method may include powering the ballast without an electrolytic smoothing capacitor, directly from the rectified AC voltage that is chopped by the TRIAC dimmer, and supporting lamp operation during the off time of the TRIAC, such as with a smoothing electrolytic capacitor-less D.C. bus. Implementation of the method may include additional features comprising charging a small low voltage capacitor from the DC bus via a DC-to-DC step down current limiting converter during the TRIAC "on" intervals and discharging this capacitor directly to the DC bus during TRIAC "off" intervals, for maintaining uninterruptable current in the gas discharge lamp.

In another aspect, the invention may feature a DC current charge circuit for charging a low voltage capacitor. In one of disclosure embodiments the charger may be built as charge pump connected to the output of the ballast resonant inverter.

In the other aspect, for dimming of inductively coupled lamps, the invention may feature a secondary series resonant tank for stepping down the DC bus voltage for charging a low voltage capacitor. The secondary resonant tank may be coupled to the switching transistors of the ballast resonant inverter.

Figure 5:
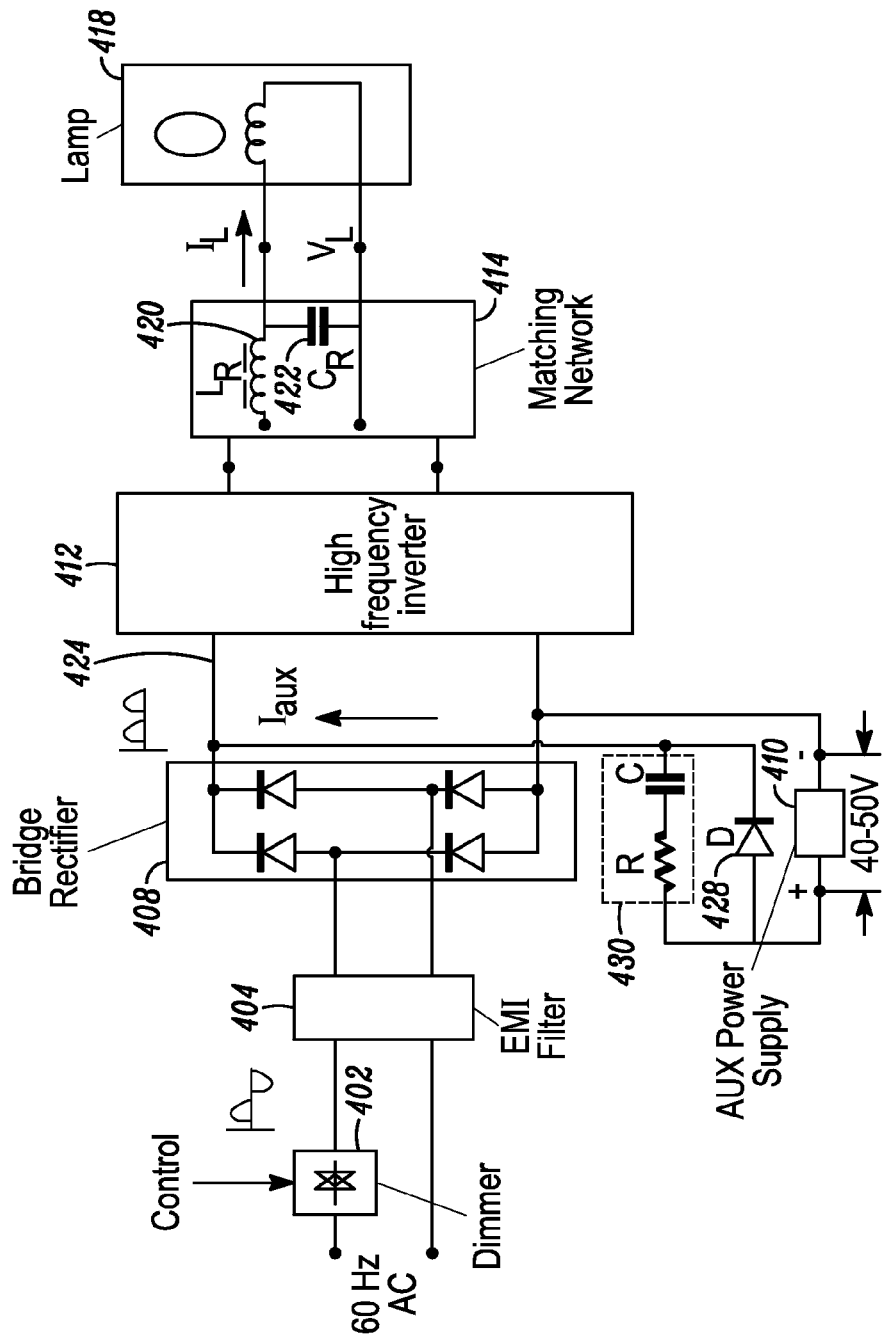
FIG. 5 shows a block diagram of an electronic ballast with a dimming arrangement in accordance with the present invention.

FIG. 5 shows block-circuit diagram of an electronic ballast connected to a TRIAC dimmer 402. The dimmer 402 may be for instance, a wall dimmer aimed for controlling incandescent lamps. The electronic ballast may feature a front-end power supply without a traditional smoothing capacitor, such as with a smoothing electrolytic capacitor-less D.C. bus. It may comprise an EMI filter 404, a Bridge Rectifier 408, a high frequency Inverter 412 (e.g. a 2.5 MHz inverter), and resonant load that includes Matching Network 414 and electrodeless Lamp 418. In accordance with exemplary and non-limiting embodiments, the high frequency inverter may be selected to operate at a very wide frequency range such as tens of KHz to many hundreds of MHz. The Matching Network 414 may utilize a circuit having resonant inductor LR 420 and resonant capacitor CR 422 with the Lamp 418 connected in parallel with the resonant capacitor CR 422. An auxiliary low voltage (40-50V) DC power supply 410 may be connected to the DC bus 424 of the inverter via a backup diode D 428 for filling in rectified voltage valleys. The power supply 410 may be built as a DC-to-DC step down converter powered from the DC bus 424. The auxiliary DC power supply 410 may comprise a small low voltage storage capacitor (which may be electrolytic or tantalum type) for maintaining uninterruptable low power lamp operation during the TRIAC "off" time intervals. The R-C network 430 may be connected across the diode D 428 for providing latching current pulse of very short duration (20-40 usec) to the TRIAC after its triggering. By having a low voltage power supply 410 (40-50V or even lower), a wider dimming range may be achieved.

Figure 6:
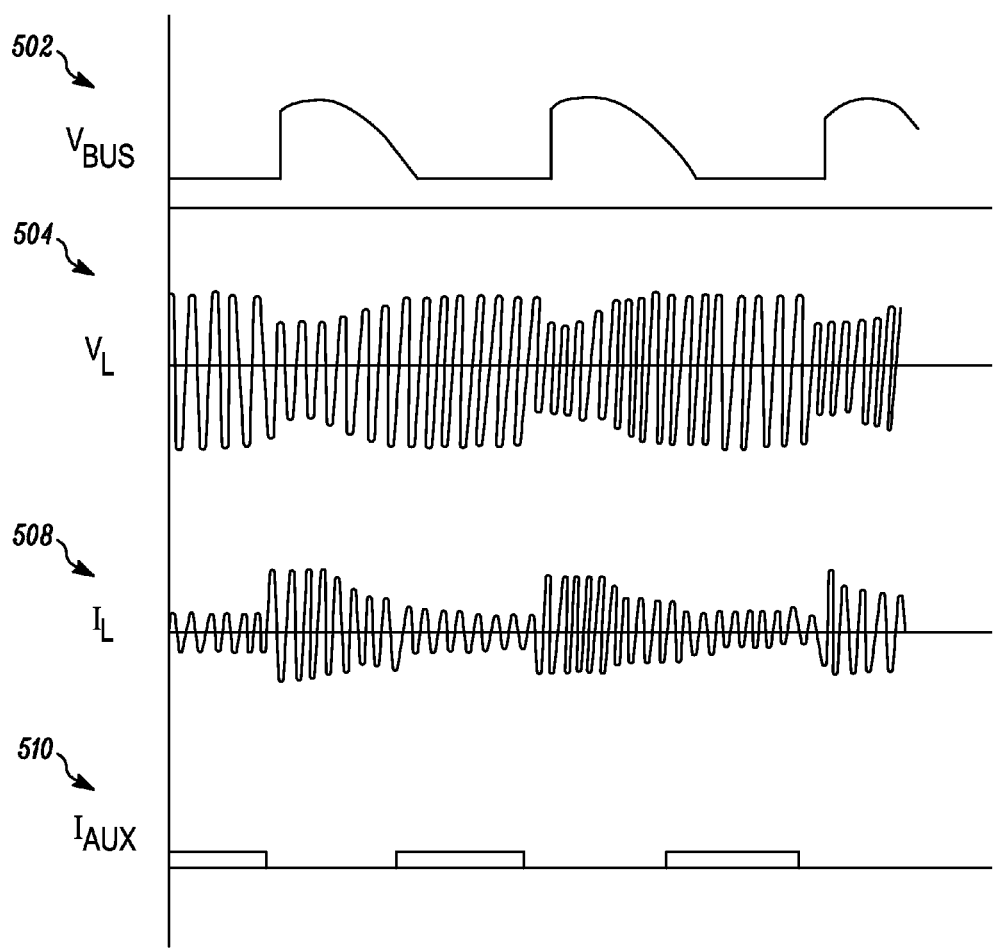
FIG. 6 illustrates the ballast and lamp operation method in accordance with an exemplary embodiment.

In FIG. 6, dimming operation of the lamp and ballast of FIG. 5 is illustrated by showing wave forms of the DC bus voltage $V_{BUS}$ 502, Lamp voltage $V_L$ 504, Lamp current $I_L$ 508, and auxiliary power supply current $I_{AUX}$ 510. In comparison with the prior art method demonstrated in FIG. 3, the lamp current continues during the TRIAC "off" intervals, so that the ballast and the lamp do not need to restart. To keep the Lamp "on" at minimum current only 15-20% of nominal lamp power may be needed. This power may be obtained from an external or internal DC source.

In accordance with exemplary and non-limiting embodiments a method for a dimming gas discharge lamp powered by an electronic ballast with a front-end power supply without an electrolytic smoothing capacitor is provided. Said method may feature uninterruptible lamp operation and comprises steps of charging a low voltage storage capacitor during the TRIAC "on" time intervals and discharging said low voltage storage capacitor to the DC bus during the TRIAC "off" time intervals. Since the low voltage storage capacitor for supporting lamp operation must store only a small amount of energy, its overall size may be substantially less than the size of a storage capacitor in the prior art dimmed ballasts with boosting voltage charge pumps. Since auxiliary voltage $V_{AUX}$ may not exceed 50V, a miniature tantalum capacitor may be used in the ballast.

Figure 7:
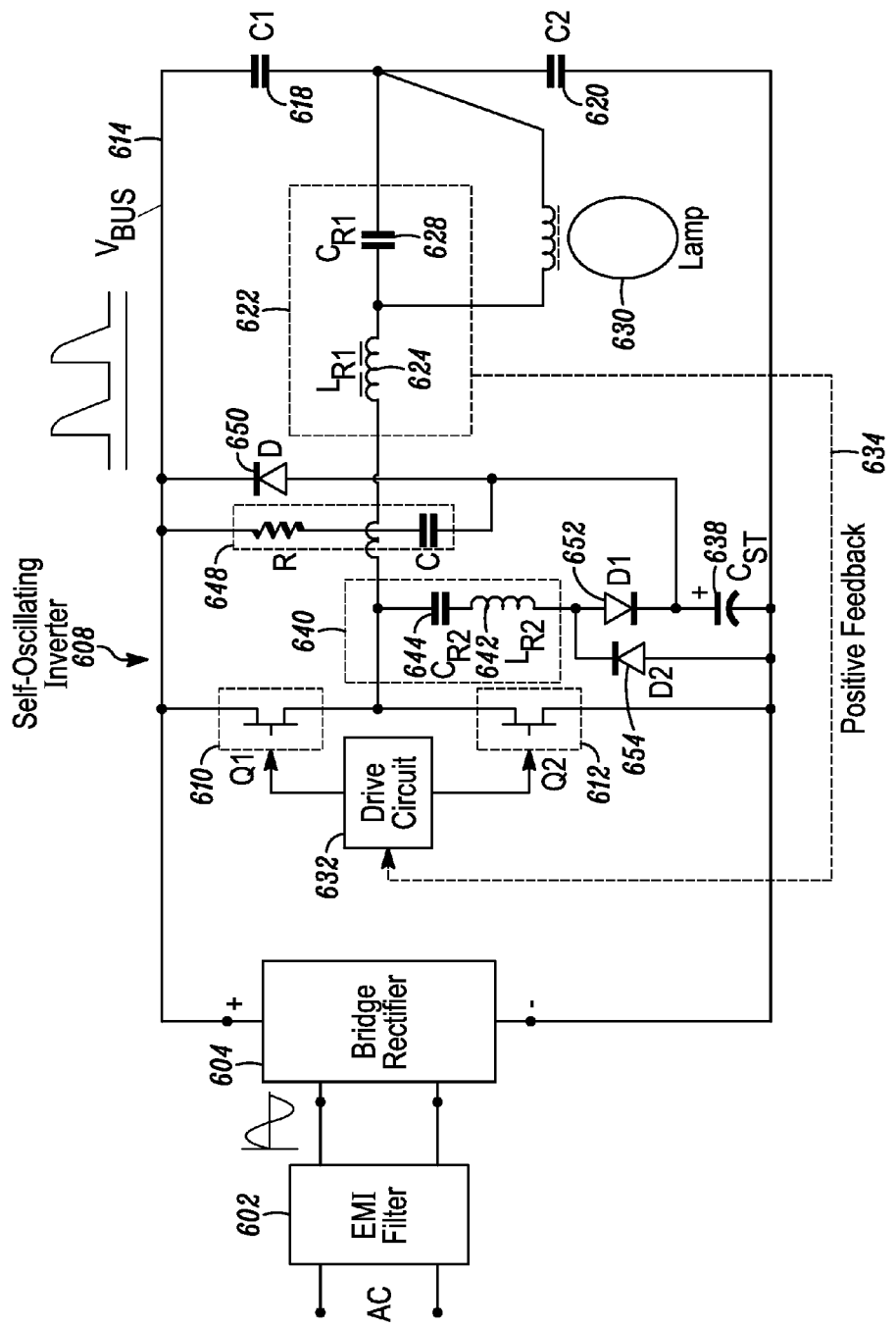
FIG. 7 shows a block-schematic diagram of the TRIAC dimmed ballast according to an exemplary embodiment.

In accordance with exemplary and non-limiting embodiments an electronic ballast is provided without an electrolytic DC bus smoothing capacitor. FIG. 7 illustrates a block-circuit diagram in an embodiment of the disclosure, preferably for RF electronic ballasts. It may comprise a ballast connected to a TRIAC dimmer (not shown). The ballast front-end power supply may comprise an EMI filter 602 and a bridge rectifier 604. There may not be a traditional electrolytic capacitor connected in parallel to the output of the bridge rectifier 604. A self-oscillating inverter 608 may be built with a half bridge topology but other relevant inverter topologies may also be used. The inverter 608 may comprise a pair of series MOSFET switching transistors Q1 610 and Q2 612, connected across DC bus 614, a capacitive divider with capacitors C1 618 and C2 620 across the DC bus 614, parallel loaded matching network 622 having a first series resonant inductor LR1 624 and a first resonant capacitor CR1 628. Inductively coupled Lamp 630 may be connected in parallel to the first resonant capacitor CR1 628. The combination of the matching network and the inductance of the lamp coupler forms a first resonant circuit. Transistors Q1 610 and Q2 612 may be driven by a drive circuit 632 coupled to the inverter 608 via a positive feedback 634 circuit (not shown), for self-excitation of the inverter 608.

In accordance with exemplary and non-limiting embodiments, FIG. 7 shows the auxiliary power supply combined with the inverter power stages, comprising the transistors Q1 610 and Q2 612. The inverter 608 may include a low voltage storage capacitor $C_{ST}$ 638 having a positive terminal connected to DC bus 614 via a backup diode D 650 and a negative terminal connected to DC bus negative terminal. The inverter 608 may also feature a second, series loaded, current limiting resonant tank 640 comprising a second resonant inductor LR2 642 and a second resonant capacitor CR2 644. A secondary high frequency rectifier having diodes D1 652 and D2 654 may be connected in series with the indictor LR2 642 and capacitor CR2 644. Rectified current charges the storage capacitor $C_{ST}$ 638. A ceramic bypass capacitor (not shown) may be connected in parallel to the storage capacitor $C_{ST}$ 638 for RF application. The power of the second resonant circuit may be much less than the first one, so that a tiny Schottky diode array, for instance, BAS70-04 may be used for 652 and 654 in the secondary rectifier circuit. An RC-network 648 may be connected across the diode 650 for conditioning the external TRIAC dimmer. In the ballast of FIG. 7, the storage capacitor $C_{ST}$ 638 may have much less energy storage than a traditional DC bus high voltage capacitor, where its rated voltage may be about 50V. The low voltage storage capacitor $C_{ST}$ 638 may have much smaller dimensions than the traditional high voltage DC bus capacitor in prior art ballasts.

Figure 8:
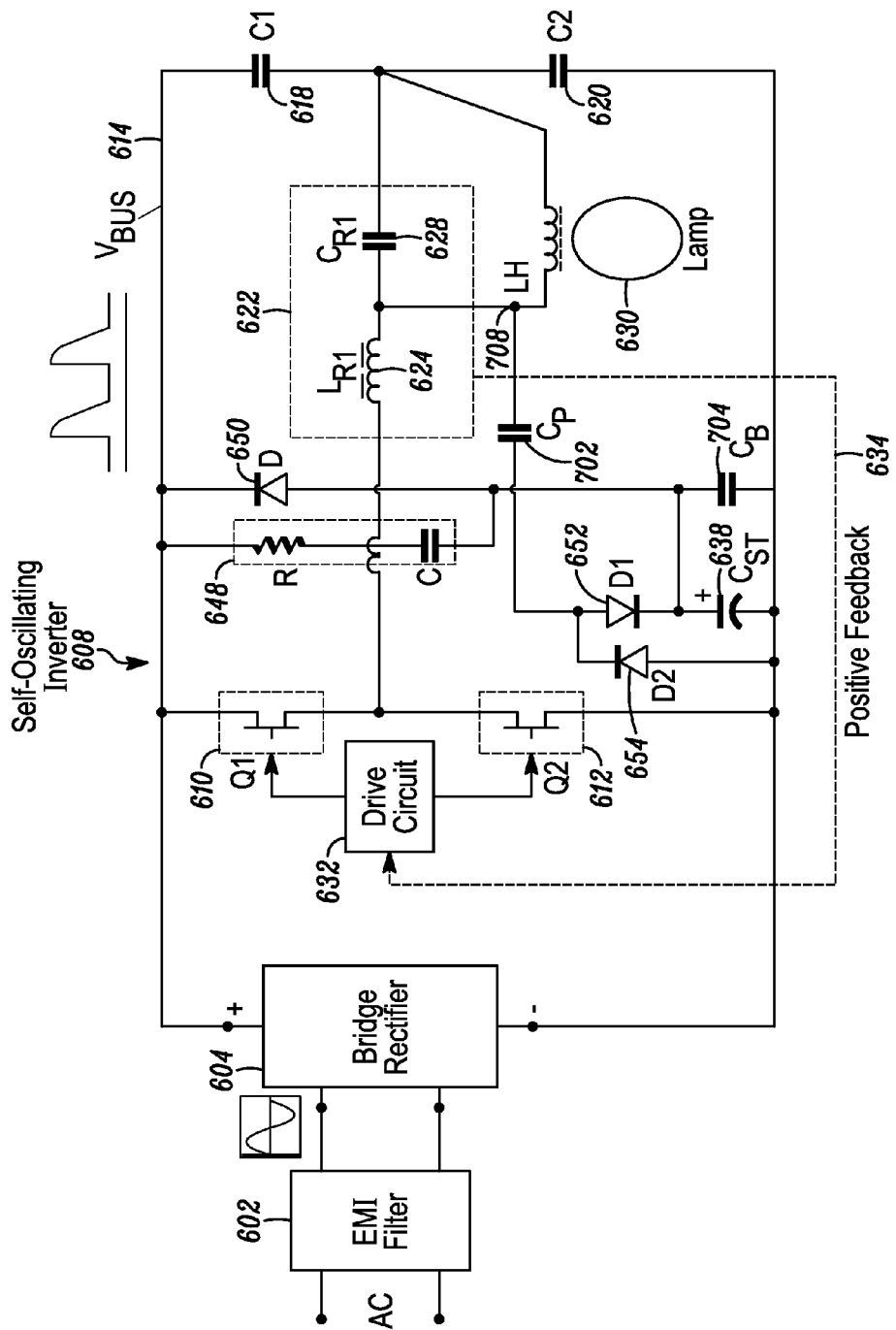
FIG. 8 shows a block-circuit diagram according to an exemplary embodiment.

In accordance with exemplary and non-limiting embodiments, FIG. 8 demonstrates another low cost configuration. This embodiment differs from that presented in FIG. 7 by the way in which the storage capacitor $C_{ST}$ 638 is charged. In the inverter 608 of FIG. 8 $C_{ST}$ 638 is charged by a charge pump from the inverter output. A series capacitor Cp 702 is connected between the inverter high voltage terminal LH 708 and the diode configuration of D1 652 and D2 654. Charge current is determined by value of capacitor Cp 702. A bypass capacitor $C_B$ 704 may be connected across the storage capacitor $C_{ST}$ 638.

Comparatively, the arrangement in FIG. 8 may provide faster low voltage capacitor $C_{ST}$ 638 charging during lamp starting. But it may slow down the starting process of an electrodeless lamp by taking power from the lamp and returning said power to the inverter input. Also, this power feedback may cause system stability problems during steady-state system operation because of the negative incremental impedance of the lamp.

The additional component LR2 642 in FIG. 7 may provide full decoupling from resonant load and the lamp. It may provide reliable starting and high efficiency due to the step down feature of the series load connection. To help guarantee Zero Voltage Switching (ZVS), the second resonant tank should operate in inductive mode, such as when $\omega LR2 > 1/\omega CR2$. In an example, for a 20 W electrodeless lamp operating at 2.75 MHz, the values of secondary resonant circuit components may be the following: LR2=150 uH, CR2=18 pF; Schottky diode array BAS70-04, electrolytic capacitor $C_{ST}$=22 uF, 50V. A bypass capacitor 0.1 uF is connected across the electrolytic capacitor $C_{ST}$.

The lamp may be dimmed because of a variation of the RMS voltage applied to the lamp, with a condition that the minimum required lamp current is sustained. Some minimum DC bus voltage should be provided to ensure continuous ballast and lamp operation. During TRIAC dimming both the TRIAC formed voltage and the DC backup voltage may vary and cause lamp dimming. The lower the minimum backup voltage the wider the dimming range. This minimum voltage depends on many factors determined by the lamp and ballast or combination of both characteristics. For a 2.5 MHz electrodeless lamp the minimum operation voltage for continuation of burning may be about 38-40V at 20° C. ambient temperature.

Figure 9:
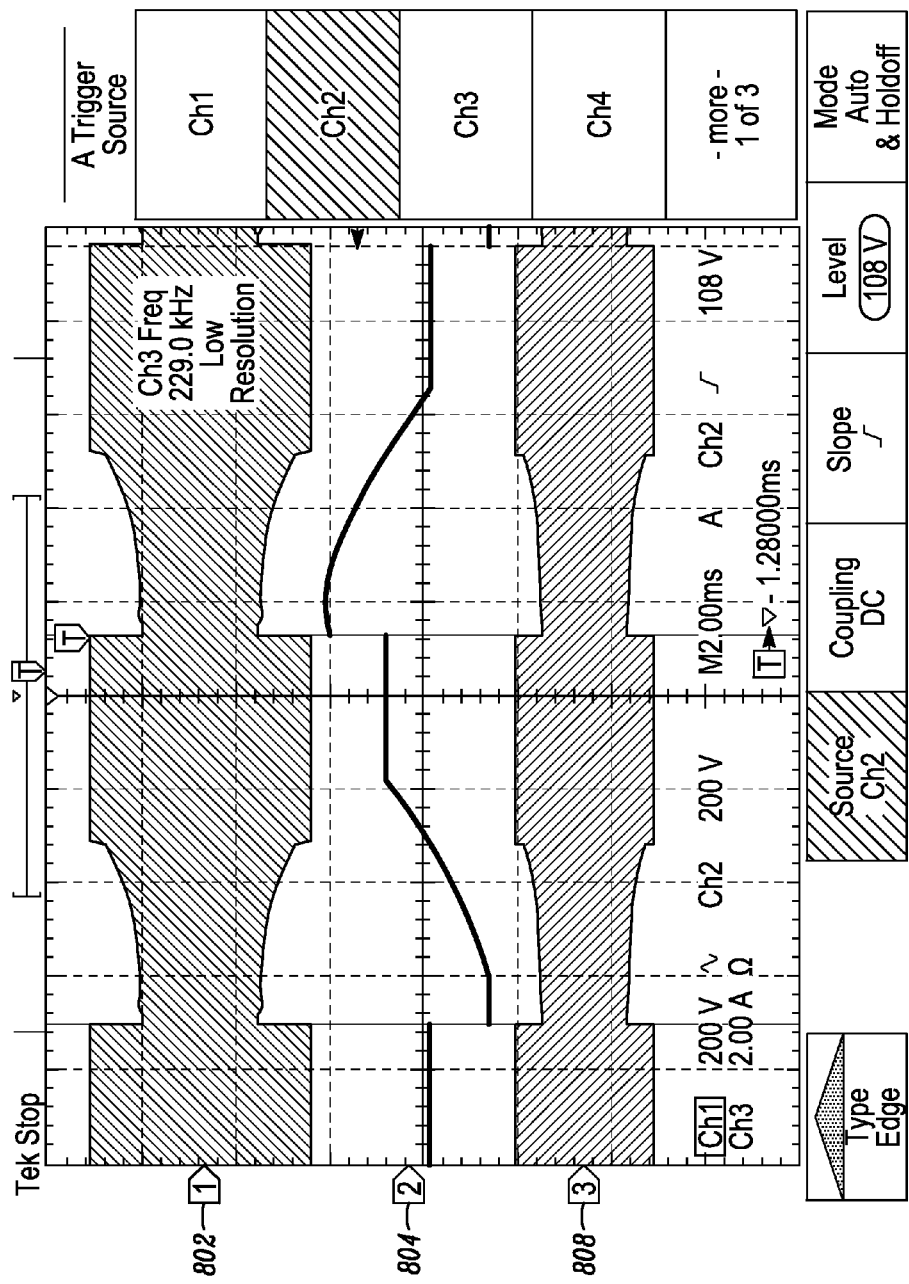
FIG. 9 shows oscillograms of the TRIAC voltage, lamp current and lamp voltage in a dimming mode, according to an exemplary embodiment.

FIG. 9 shows actual oscillograms taken from operation of a 20 W, 2.75 MHz electrodeless lamp using a ballast with the preferred embodiment, when powered with a TRIAC dimmer. Ch2 804 shows the TRIAC dimmer output voltage, Ch1 802 shows lamp voltage, and Ch3 808 shows lamp current. The backup DC voltage is about 45V. As can be seen the lamp and ballast operate continuously with the TRIAC dimmer. In this example, the lamp is dimmed to 60%.

At low bus voltage, lamp voltage (Ch1) is increased, since the gas discharge is characterized by negative impedance. Inductively coupled lamps are distinguished by a significant leakage inductance. That is why lamp voltage increases correspondingly with lamp current (Ch3).

Dimming: Burst Mode Dimming

Burst mode dimming is a method to control the power delivered to the burner, and the light generated by the burner that uses periodic interruptions of the high frequency signal delivered to the coupler from the ballast.

One way to control the power delivered to the burner and hence control the light output of the burner, is to turn the high frequency current delivered by the ballast to the coupler, $I_C$, on and off on a periodic basis at a rate that is much lower than the frequency of the high frequency current itself. That is, if the high frequency current has a frequency of $f_O$ and the rate of the periodic signal is $f_M$, then $f_M$ would be much lower than $f_O$.

The time duration of each On period and each Off period of $I_C$ will be less than $1/f_M$, and the sum of the time duration of the On period and the time duration of the Off period will equal $1/f_M$. Since $f_M$ is much lower than $f_O$, each On period of $I_C$ will ideally have more than 10 cycles of $I_C$.

In some embodiments it may be desirable that the Off period time of $I_C$ be shorter than the time required for the electron density of the discharge to substantially decrease. For the exemplar induction coupled lamp, this time is believed to be about 1 msec.

In other embodiments it may be desirable that the Off period time of $I_C$ be longer than the time required for the electron density of the discharge to substantially decrease. For the exemplar induction coupled lamp, this time is believed to be about 1 msec.

In some embodiments it may be desirable that $F_M$ be higher than 20 kHz, so that the circuits used to generate this signal do not create audible noise, while in other embodiments it may be desirable that $F_M$ be lower than 20 kHz so that the Off period time duration of $I_C$ can be longer than the time required for the electron density to substantially decrease.

For example, if $F_M$ is set to 25 kHz the Off time will always be less than 0.04 msec. In addition, if $F_M$ is set to 25 kHz, and the On time is set to 1% of the time rate of the modulation frequency, 1/25 kHz, the On time will be 0.4 μsec, and this time period will contain 10 cycles of IC when $f_O$ is 25 MHz. In this manner periodic bursts of current at a frequency of $f_O$ and controllable duration can be applied to the coil that is driving the lamp or discharge.

This power control method may be used to reduce the power delivered to the lamp when less light is required and less power consumption is desired. This is known in the art as dimming.

The dimming function can be controlled by a circuit that senses the firing angle of a TRIAC-based phase cut dimmer installed in the power supply for the lamp, or it may be controlled by a control means mounted on the lamp itself, or by radio waves or by infrared control, or any other suitable means.

The power control method can also be used to provide accurate operation of the lamp without the use of precision components in the high frequency oscillator. The circuit could be designed to produce somewhat more than the rated power of the lamp, and then the burst mode power control could be used to reduce the power to the rated value.

The power control could also be used to provide shorter run-up times for mercury-based lamps. When used in this manner, the circuit providing $I_C$ would be designed to produce 20% to 50% more current than necessary for steady state operation. When the lamp is cold and the mercury vapor pressure is low, the extra current would provide more light and facilitate faster heating of the mercury, which would, in turn, provide a faster rise in mercury vapor pressure from its value at room temperature toward the optimum mercury vapor pressure, which occurs at temperatures higher than 20° C. As the lamp warms up to its normal operating temperature, the power control would reduce the power gradually to its normal value. The lamp would not overheat when operated at higher than normal power to implement this feature because the higher power would be applied only when the lamp is at a temperature lower than its normal operating temperature.

TRIAC Holding and Trigger Current: Pass-Through Current

It is desirable for all types of lighting, especially screw-in light bulbs, to be compatible with TRIAC-based phase cut dimmers due to the low cost and ubiquitous presence of these dimmers in lighting installations. These dimmers are wired in series with the AC line voltage and the lighting load. Accordingly, any current drawn by the dimmer circuit needs to pass through the load. In particular, these dimmers include a timing circuit in which the applied line voltage charges a capacitor through a variable resistor. Each half-cycle of the line frequency, the capacitor is charged up to a threshold voltage at which a semiconductor break-over device (typically a 32 volt DIAC), conducts a pulse of trigger current into the gate terminal of the TRIAC to put the TRIAC into a conductive state.

A resistive load like an incandescent light bulb naturally conducts the current required by the timing circuit for triggering the TRIAC into the on-state. In contrast, electronic circuits, such as used with fluorescent lamps, may not conduct current at low input line voltages. Typically, they include an energy storage capacitor to hold up the supply voltage for the load continuously throughout the line cycle. In the case of a fluorescent ballast, this energy storage capacitor typically supplies an inverter circuit that converts the DC voltage on the storage capacitor to an AC current for powering the fluorescent lamp. When the instantaneous line voltage is low, the rectifier or other circuit that charges the energy storage capacitance will not draw current from the line. Even without an energy storage capacitor, there will be a minimum voltage required for the inverter or other electronic circuit to operate.

In addition to the timing circuit of the dimmer, some dimmers may contain one or more indicator LED's or other electronics that require the load to pass current for proper operation.

A resistor placed across the input of the electronic ballast might draw the required pass-through current prior to the dimmer TRIAC switching to the on-state; however, the full line voltage would be applied to this resistor while the TRIAC is on, therefore dissipating too much power and generating too much heat for this to be a practical solution.

This invention addresses the pass-through current requirement in an electronic lighting load operating with a TRIAC dimmer as described herein.

Figure 10:
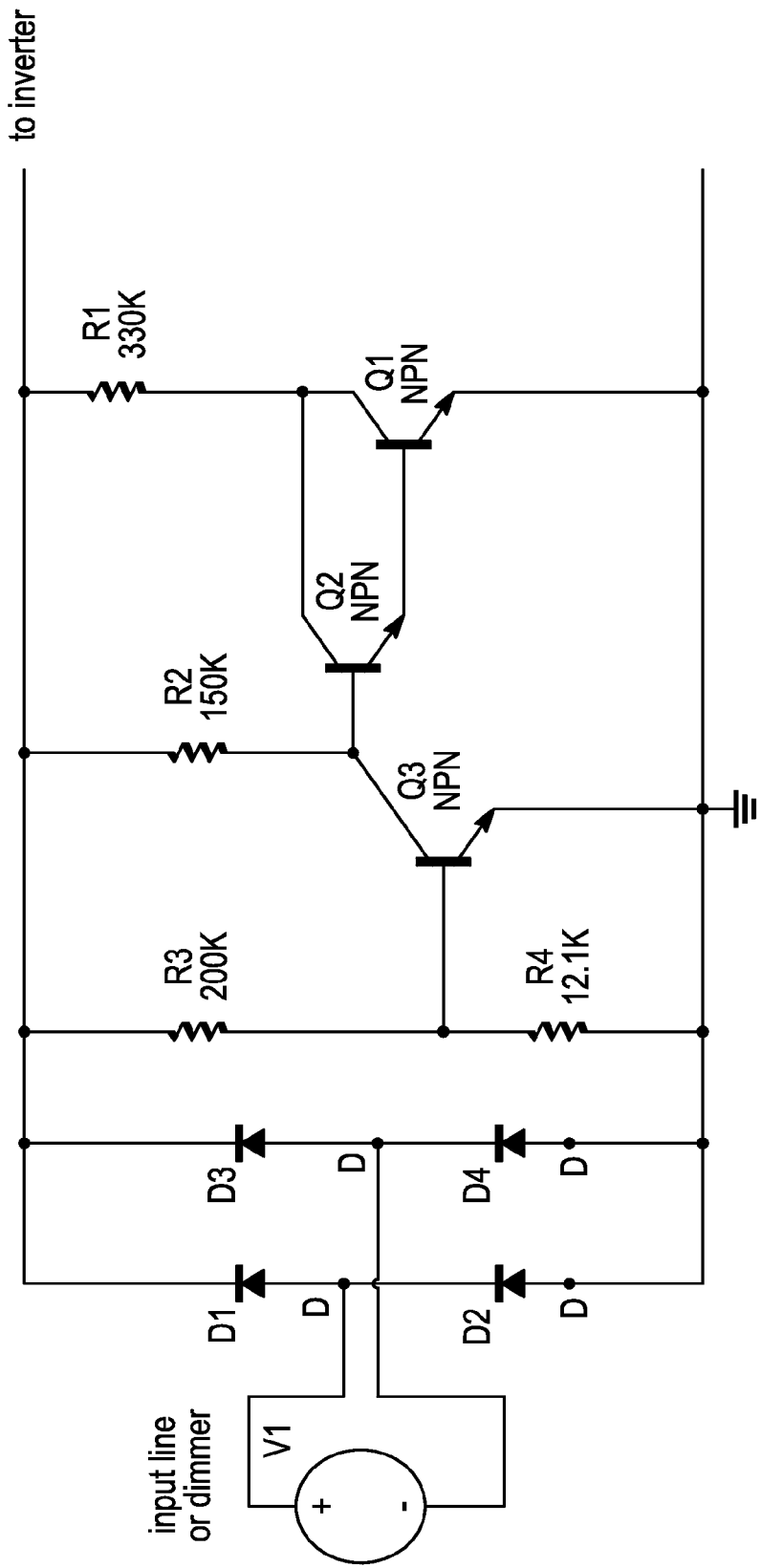
FIG. 10 shows an embodiment for a pass-through circuit.

The invention consists of a circuit with a resistor load that is switched off when the applied line voltage exceeds a relatively low threshold. A primary embodiment of the invention is shown in FIG. 10, where the threshold is set for 10 volts. V1 represents the input line voltage presented by the dimmer. Q1 and Q2 form a Darlington transistor pair for switching load resistor R1, and these transistors must be rated about 200V or higher for a 120 VAC line. Resistor R2 provides base drive to Q2. With a net current gain (beta) value of at least 500, Q2 will, for example conduct approximately 15 mA (pass-through/trigger current) with 6V on the input line. When the input voltage exceeds approximately 10V, resistors R3 and R4, bias Q3 into the active region where it conducts enough current to cut off the base drive to Q1/Q2.

The value of R1 is selected here such that, even if the maximum of 10 volts were applied to the circuit continuously, power dissipation would be only about ¼watt. Normally, the power dissipation would be much less than this because the series resistance in the dimmer is normally 10 kiliohms or larger, resulting in less than 3.5% of the line voltage appearing across the pass-through circuit, and once the TRIAC is triggered, the applied voltage would exceed the 10 volt threshold, thereby blocking current flow in the load resistor R1.

Besides varying resistor values and resulting threshold voltages, other embodiments of this invention, may replace the combination of Q1/Q2 with a switch such as a MOSFET (with a zener diode to protect its gate), or under some conditions, a single bipolar transistor may provide sufficient gain. Q3 can also be implemented by some other switch or its function may be incorporated into an integrated circuit.

This discrete circuit can operate with very low voltages across the ballast input and begin to draw current when the supply voltage exceeds a small threshold voltage, approximately 1.2V in the embodiment of FIG. 10. This feature allows the circuit to operate when the TRIAC is off, giving smoother operation during startup and at very low dimmer settings where the TRIAC does not turn on. An LED on the dimmer, for example, could still be lit by this pass-through circuit at such low dimmer settings.

The load resistor will not be connected all the time, either continuously or pulsed, while the resistor in this invention will be disconnected when the voltage is higher than the set point.

Other TRIAC Holding and Trigger Current Circuits

Other circuits and/or components associated with TRIAC holding and trigger current may provide benefits, such as a charge pump, a voltage boost, an AC load capacitance, a constant current load, a circuit for limiting electrolytic capacitor current with a current source, a circuit for providing frequency dimming, a shutdown circuit, and the like.

EMI

The issue of electromagnetic interference (EMI) inflicted by any industrial and consumer product utilizing RF power is the subject of strict domestic and international regulations. According to these regulations, the EMI level emanating from RF light sources must not exceed some threshold value that may interfere with operation of surrounding electronic devices, communication, remote control gadgets, medical equipment and life supporting electronics. The permitted EMI level for consumer lighting devices is relaxed at frequencies from 2.51 MHz to 3.0 MHz, but the increase in allowable EMI is limited and EMI still has to be addressed to comply with the regulations.

The conductive EMI of an RF light source (also referred herein as an RF lamp or lamp) is originated by the lamp RF potential $V_p$ on the lamp surface inducing an RF current $I_g$ to the ac line as displacement RF current through the lamp capacitance C to outer space (ground) according to the expression:

$$I_g = V_p 2\pi f C$$

where: $V_p$ is the lamp surface RF potential, and f is the lamp driving frequency. The lamp capacitance can be evaluated in the Gaussian system as equal to the lamp effective radius R, C=R in cm or in the SI system as 1.11 R in pF. For an RF lamp size of A19 this capacitance is estimated as about 4 pF; that results in $V_p$=1 V corresponding to existing regulation limit at 2.65 MHz.

The value of the lamp RF potential $V_p$ is defined by capacitive coupling between the RF carrying conductors (mainly the winding of the lamp coupler and associated wire leads) and the lamp re-entrant cavity housing the lamp coupler.

The EMI compliance is especially problematic for integrated, self-ballasted compact RF lamps. The requirements for these compact RF lamps are much stronger, since they are connected to ac line directly through a lamp socket and have no special dedicated connection to earth ground, as is the case for powerful RF lamps having remote grounded ballasts.

One effective way to reduce the RF lamp potential is to us a bifilar coupler winding consisting of two equal length wire windings wound in parallel, and having their grounded ends on the opposite sides of the coupler.

The essence of this technique is the RF balancing of the coupler with two non-grounded wires on the coupler ends having equal RF potential but opposite phase. Such balancing of the coupler provides compensation by means of opposite phase voltages induced on the re-entrant cavity surface, and thus, on the plasma and the lamp surface.

Although this technique for reduction of conductive EMI has significantly reduced the lamp RF voltage and has been implemented in many commercial RF induction lamps, it appeared that is not enough to comply with the regulation. Some additional means are needed to farther reduce the EMI level to pass the regulations.

A variety of EMI suppression means have been proposed and many of them have been implemented in the market through the introduction of RF compact fluorescent lamps. Examples include a segmented electrostatic shield between the coupler and re-entrant cavity to reduce conductive EMI, a light transparent conductive coating placed between the lamp glass and phosphor, and an external metal conductive coating for lamp RF screening.

An alternative (to bifilar winding) way to balance RF coupler has been proposed for RF balancing the coupler by winding on it two wires in the azimuthally opposite directions and to optionally drive such coupler with a symmetrical (push-pull) output ballast. Although the degree of RF compensation in the coupler balancing is expected to be higher than that at bifilar winding, the proposed scheme of compensation has many disadvantages that offset its positive expectation.

Some of the considered above means for EMI reduction are associated with reduction in lamp light output and considerable RF lamp complexity and thus, increased cost.

Another solution of the EMI problem has been proposed that, instead of a complicated shielding of the entire lamp, involves a combination of a bifilar symmetric winding with screening of the RF wire connecting the coupler with the ballast by a braided shield. This measure appeared to be enough to pass EMI regulation, yet resulted in lamp simplification.

It would be an advance in the art of EMI reduction of inductive RF fluorescent lamps if one could further improve the EMI shielding at reasonable cost to allow more usage in commercial and residential applications.

The exemplary embodiments that follow provide an RF induction lamp with simple and low cost means for suppressing electromagnetic interference. This goal may be achieved by a bifilar winding of the lamp coupler having unequal winding wire lengths and by effective grounding of the coupler ferromagnetic core with a conductive foil shell in conductive contact with the coupler ferromagnetic core. This inexpensive solution may reduce the conductive electromagnetic interference (EMI) level sufficiently to pass all existing regulations on such interference with significant reserve.

In view of the limitations now present in the related art, a new and useful RF inductive lamp with simplified and effective means for conductive EMI suppression without lamp RF screening and shielded RF wiring is provided.

In accordance with exemplary and non-limiting embodiments, the lamp coupler may be wound with a bifilar winding having an unequal number of turns, in such a way that additional turns of the passive winding compensate the capacitive coupling (to the lamp re-entrant cavity) of the RF connecting wire of the active winding. Due to opposite phases of RF voltages on the non-grounded ends of active and passive windings, the compensation takes place when the induced RF capacitive currents of opposite phase on the re-entrant cavity are equal or approximately equal to each other.

In accordance with exemplary and non-limiting embodiments, a grounded foil shell (tube) may be inserted into the ferromagnetic core of the coupler to reduce the coupler uncompensated common mode RF potential, where the ferromagnetic core may be a tubular ferromagnetic core. Due to the large shell surface contacting with the core and the very large dielectric constant (or large electrical conductivity) of ferromagnetic materials, the RF potential of the coupler and thus the conductive EMI created by RF lamp may be significantly reduced.

In accordance with exemplary and non-limiting embodiments, the radial position of the coupler may be fixed inside the re-entrant cavity to prevent its direct mechanical contact to the coupler, which tends to dramatically increase capacitive coupling and thus, conductive EMI. To provide a minimal capacitive coupling to the re-entrant cavity, the air gap between the coupler and re-entrant cavity may need to be fixed and equal over all surface of the coupler. Such fixation may be realized by means of an increased coupler diameter on its ends with an additional bonding, a ring spacer set on the coupler ends, and the like.

In accordance with exemplary and non-limiting embodiments, a spatially stable position of the connecting RF wire in the volume outside of the ballast compartment may be provided by mechanical fixing the wires on the inside of the lamp body. Such measure would keep the capacitance of the RF connecting wire to the re-entrant cavity at a fixed value during lamp assembling and reassembling.

Figure 11:
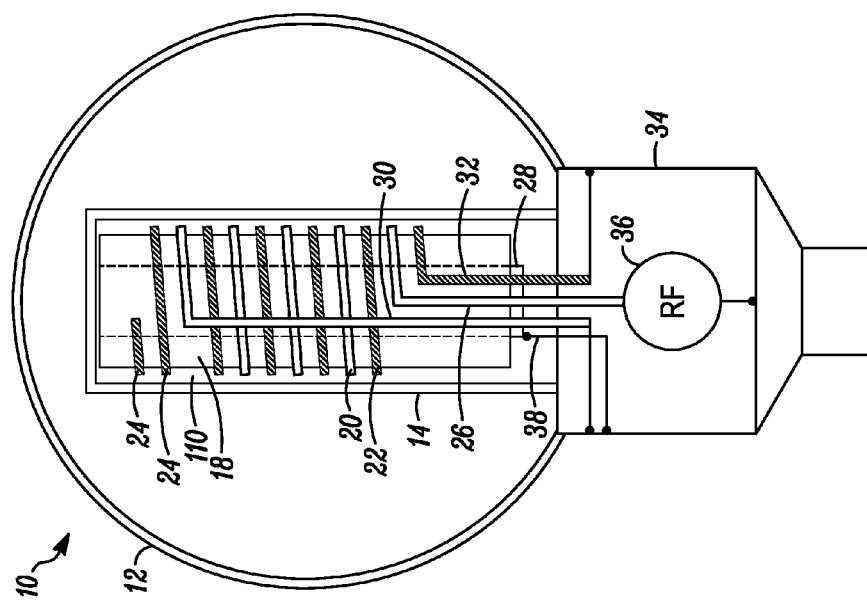
FIG. 11 depicts an exemplary embodiment cross-section view of an RF induction lamp.

FIG. 11 illustrates a cross-section view of an inductive RF lamp in accordance with an exemplary and non-limiting embodiment. The RF lamp 10 comprises of a glass envelope 12 with a glass re-entrant cavity 14 sealed into the envelope 12 and forming a gas discharge vessel (burner) between them. The lamp burner is filled with a working gas mixture of a noble gas such as Argon, Krypton or others and Mercury vapor. The inner surface of burner, both the envelope 12 and the re-entrant cavity 14, are covered with a phosphor. With plasma discharge maintained in the burner, the UV radiation from plasma excites the phosphor, which converts UV light to visible light.

The plasma within the burner is maintained by the electric field created by time-varying magnetic field created by the RF lamp coupler 110 sitting inside the re-entrant cavity 14. The coupler 110, comprising a core 18 and winding(s) 20, 22, is energized by an RF power source (RF ballast) 36 placed in the ballast cap 34 and electrically connected to the local ground (buss), where the ballast cap 34 may be either non-conductive or conductive with a non-conductive coating on the outside to prevent electrical shock. In this embodiment, the coupler 110 consists of a ferromagnetic core 18 that may be a ferrite with high magnetic relative permeability $\mu_r \gg 1$, such as where $\mu_r$ is between 20 and 2000. For the frequency of 2.51 MHz to 3.0 MHz allocated for RF lighting, the preferred material may be Ni—Zn ferrite with relative permeability $\mu_r$ around 100 having high Curie temperature $T_c > 300°$ C.

Two windings 20 and 22 may be bifilarly wound either directly on the core 18 of the coupler 110, or with any form or spool between them. The first active winding 20 is connected to the ballast 36 with its RF end 26 and its grounded end 30. RF current in this winding creates RF magnetic induction in the core that in turn creates the time-varying electric field that maintains the discharge plasma in the lamp burner.

The second, passive, winding 22 has the function only of inducing the opposite (reference to the first winding 20) phase voltage on the coupler 110, (thereby reducing the lamp conductive EMI). The passive winding 22 may be connected to the ballast 36 only with its grounded end wire 32, leaving its RF end free.

In embodiments, the number of turns of the passive winding 22 may not be equal to that of the active winding 20. Excess turns 24 (it could be one or more turns, or a fraction of a turn) may be added to the passive winding. The purpose for addition of these excess turns 24 is to create some additional (opposite phase) RF capacitive current to the re-entrant cavity, to compensate that induced by the RF leads 26 of the active winding.

The general condition of such compensation (the equality of RF current induced with opposite phase) is:

$$\int_0^{L_1} C_1(x) V_1(x) dx = \int_0^{L_2} C_2(x) V_2(x) dx$$

Here, the integration is along the wire path x. $C_1$ and $C_2$ are the distributed capacitances correspondingly along the active winding connecting wire 26 and the passive additional winding 24; $V_1$ and $V_2$ are correspondingly, the distributed RF potentials along the wires, and $L_1$ and $L_2$ are correspondingly, the length of the connecting and additional winding wire.

Note that due to the three-dimensional structure of the RF lamp, with arbitrary RF wire positions, it is extremely difficult to calculate the functionalities $C_1(x)$ and $C_2(x)$. Therefore, the proper number of turns in the additional passive winding 24 may have to be found empirically for a specific RF lamp embodiment.

To further reduce the common mode RF potential of the coupler 110 due to its imperfect balancing, a grounded conductive foil shell (tube) 28 may be inserted into the tubular ferrite core 18 of the coupler 110. Due to the shell's large surface, its close contact to the inner surface of the core 18, and a very high ferrite core dielectric constant (or/and its high conductivity), the coupler RF potential reference to local ground is considerably reduced, and thus, conductive EMI in the RF lamp.

The shell 28 inserted into the core 18 may be made of a conductive foil, such as copper foil, aluminum foil, and the like. It may be made as a closed tube, have a slot along its axial direction, and the like. In the latter case, the shell may operate as a spring assuring a good mechanical contact with the inner surface of the core. The length of the shell may be equal, or somewhat longer or shorter than the length of the coupler. A larger contacting surface between the shell and the coupler will provide better grounding. On the other hand, a shell length shorter than that of coupler may be enough for adequate coupler grounding.

Grounding of the coupler with the inserted conductive shell has a certain advantage compared to grounding with an external conductive patch. Contrary to an external patch, the internal shell may not increase inter-turn capacitance and may not induce eddy current in the shell. Both these effects diminish the coupler Q-factor and consequently increase power loss in the coupler. The absence of an eddy current in the inserted shell is due to the fact that RF magnetic lines in the coupler are parallel to the shell and are diverging on the coupler ends, thus they are not crossing the foil surface.

Figure 12:
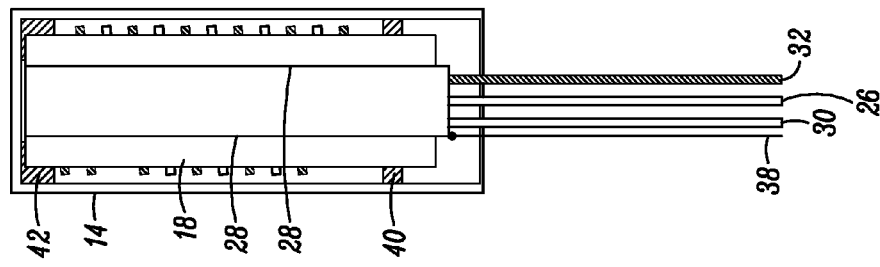
FIG. 12 depicts an exemplary embodiment cross-section view of a coupler with the inserted grounded shell.

To prevent the coupler 110 from touching the re-entrant cavity 14, and thereby increasing conductive EMI, the coupler may need to be fixed in the approximate center and approximately equidistant of the walls of the re-entrant cavity as it is shown in FIG. 12. This may be done with a pair of spacers 40 and 42 placed correspondingly on the bottom and the upper ends of the coupler 110. It may be advantageous to have an air gap between the coupler 110 and re-entrant cavity 14 rather than filling this space with some capsulation material having a high dielectric constant, e$\gg$1. In the latter case, the capacitive coupling of the coupler winding to the re-entrant cavity would increase by e times. Since in practice, it is impossible to reach the ideal RF balancing of the coupler, its residual common mode potential (and so EMI level) would be e times larger than that with air gap. It is found empirically that the gap between coupler windings and inner surface of re-entrant cavity of approximately 0.5-1.5 mm is enough for embodiments of the RF lamp to pass EMI regulations. Although, increasing of the air gap reduces conductive EMI, the inductive coupling efficiency and lamp starting would be deteriorated.

It was found in many experiments with non-shielded RF wire 26 connecting the coupler 110 to ballast 36, the conductive EMI level is extremely sensitive to the spatial position of this wire within the lamp body. An arbitrary position of this wire after the lamp assembling may diminish the effect of the measures described above towards EMI reduction in the RF lamp. Therefore, fixing the position of the wire to some lamp inner elements may be necessary. Note that wire may be needed to be fixed in position only in the space between the coupler 110 and the grounded ballast case 34. The position of the wires inside the ballast case may not be important for conductive EMI.

As it seen in FIGS. 11 and 12, four wires 26, 30, 32 and 38 may be connected between the coupler and the ballast. Indeed, in this embodiment, three of them, 30, 32 and 38 are grounded within the ballast case, and the forth is connected to the output of the RF ballast 36. Practically, only the positioning of the RF wire 26 is important for the EMI issue, but the grounded wires 30 and 32 being positioned on both side of the RF wire 26 (as it shown in FIGS. 11 and 12) partially perform a shielding function reducing the sensitivity of the conductive EMI level to the position of the RF wire. For this purpose, the wires 30, 32 and between them wire 26 may be fixed together (touching each other with minimal distance between them) on the inner lamp body, such as with some painting, a sticky tape, and the like.

Numerous experiments conducted in the laboratory showed that the exemplary embodiments considered herein are effective and inexpensive ways to address conductive EMI in an RF lamp.

Evaluation of conductive EMI levels of the exemplary embodiments described herein has been done by measurement of the lamp surface voltage Vp, which is proportional to EMI level. For instance, the maximum value of Vp corresponding to the regulation threshold for RF lamp of size A19 at 2.65 MHz, is 2.8 Volt peak-to-peak.

Figure 13:
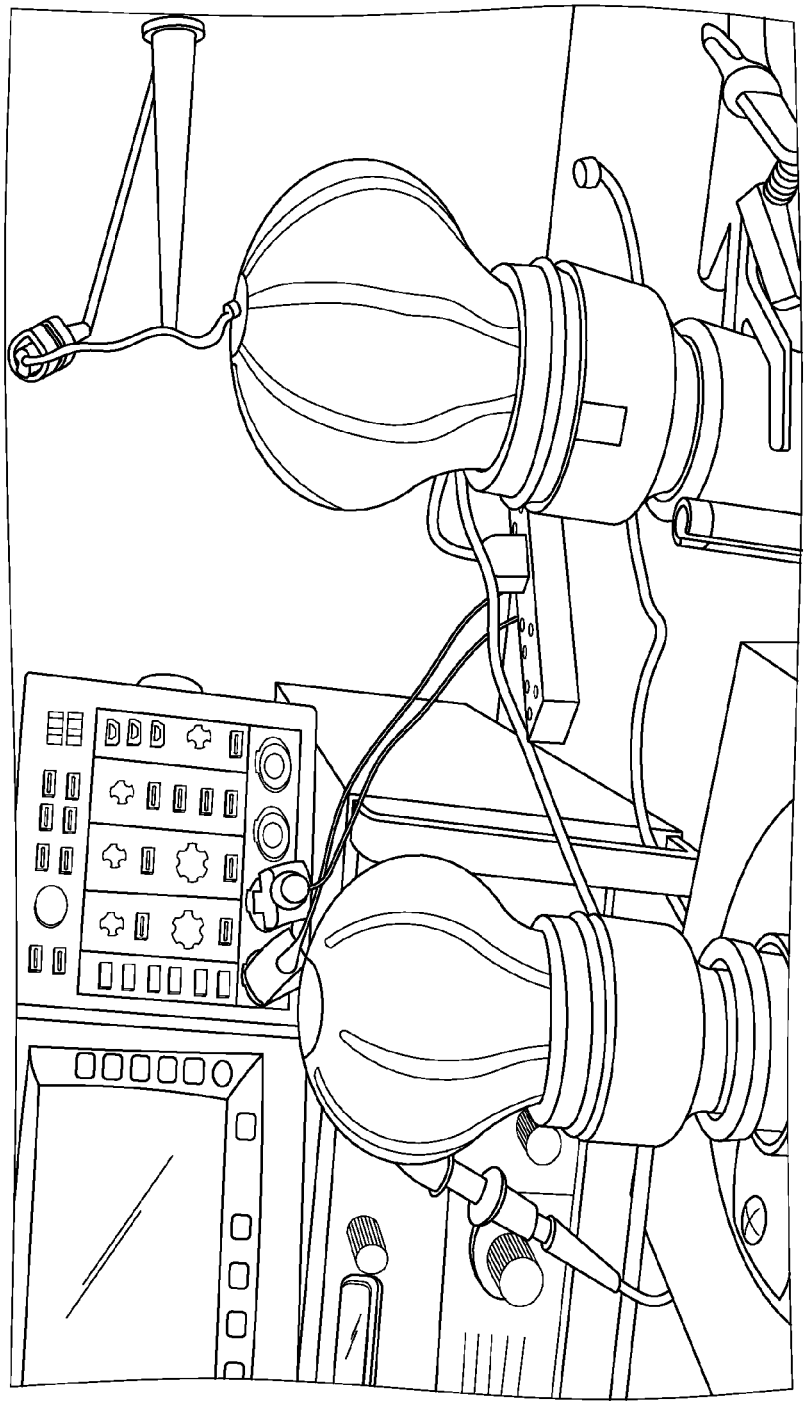
FIG. 13 shows an exemplary experimental and commercial lamp covered with copper foil for purposes of an experiment.

To measure the Vp values, the lamp glass envelope was entirely covered with thin copper foil as it shown in FIG. 13 The foil jacket had 8 meridian slots to prevent its interaction with the lamp RF magnetic field. The capacitance between the foil and the plasma inside the lamp burner was estimated as a few hundred pF, which was much larger than the input capacitance (8 pF) of the RF probe connected between the foil and a scope.

Figure 14:
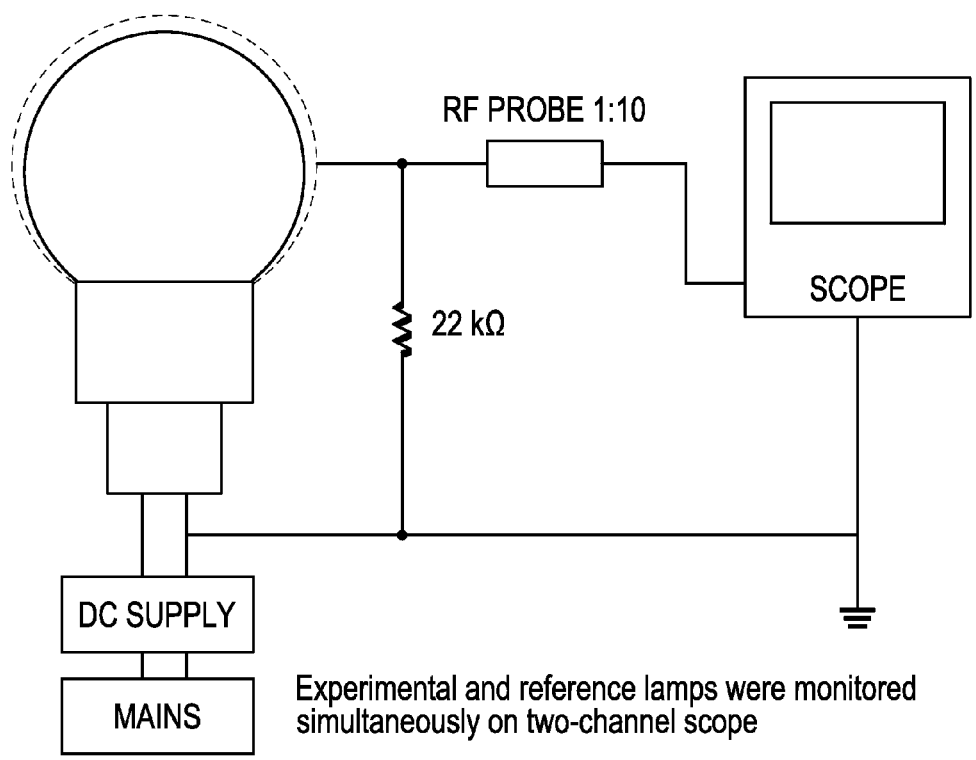
FIG. 14 illustrates an exemplary experimental set-up for measurement of the lamp surface voltage.

Concurrently, a similar measurement has been done with a commercial lamp having the same size of A19 (6 cm diameter), where the intent was to compare the EMI performance of the commercial lamp to a lamp constructed consistent with exemplary embodiments described above. Since the results of the measurements were dependent on lamp run-up time, the measurements for both lamps were performed at the same time with a two-channel oscilloscope. The experimental set-up for measurement of the lamp surface voltage Vp is shown in FIG. 14. The 22 k$\Omega$ resistor is used to prevent line frequency interference with the measurement of small RF voltages. The overall test set up was provided by the international standard on EMI test equipment, CISPR 16. Power was provided to the test lamp through a Line Impedance Stabilization Network (LISN). This network collected the EMI noise on each power line (120V and Neutral) and routed the collected EMI to a measurement analyzer. In this case, a spectrum analyzer that was specifically designed for EMI measurements was used.

In the U.S., the Federal Communications Commission (FCC) writes the rules for EMI compliance. These lamps are required to comply with FCC Part 18. There are several compliance requirements including technical and non-technical requirements, but only the FCC-specified residential market limits for EMI were used in this coupler comparison. Testing of the noise on the power line was done over the range of frequencies from 450 kHz to 30 MHz in accordance with FCC Part 18 requirements. The lamps were mounted in an open-air fixture with their bases oriented downward. The warm up times from a cold turn-on were kept the same at one hour. A peak detector (PK) was used to speed up the testing. The plots of measured data show limit lines that apply when a quasi-peak detector (QP) is used. For this lamp, QP data is typically 3 dB lower than the PK data. So if the PK data is below the limit line, the QP data will be even lower and doesn't need to be measured. Typically in EMI testing, PK data is recorded initially, and QP data is measured if the PK data is near or over the limit line. For this comparison task, measuring PK data allows the two couplers to be compared.

Figure 15:
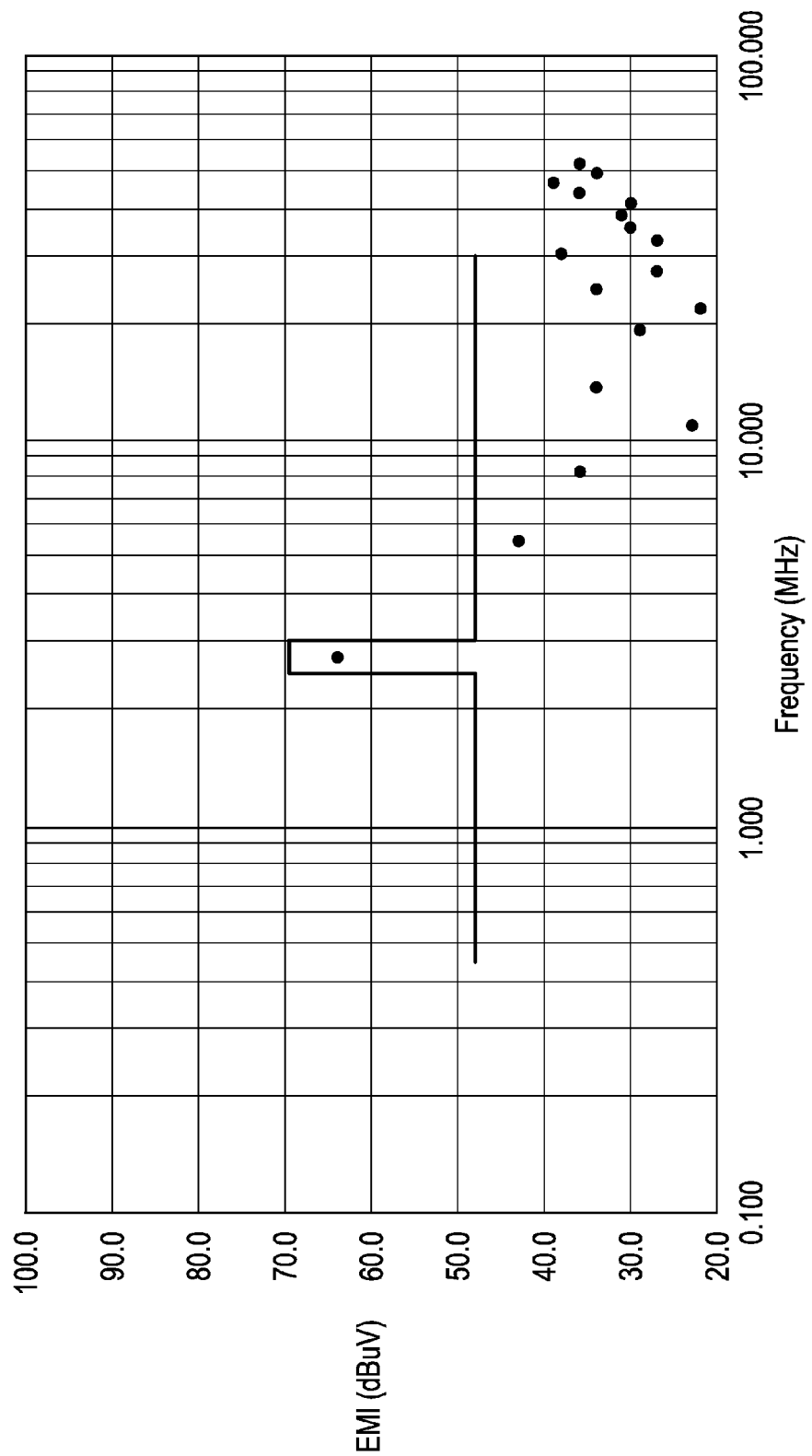
FIG. 15 provides experimental data of conductive EMI (points) and the allowed limits (lines) taken with a related art lamp using a LISN set up.
Figure 16:
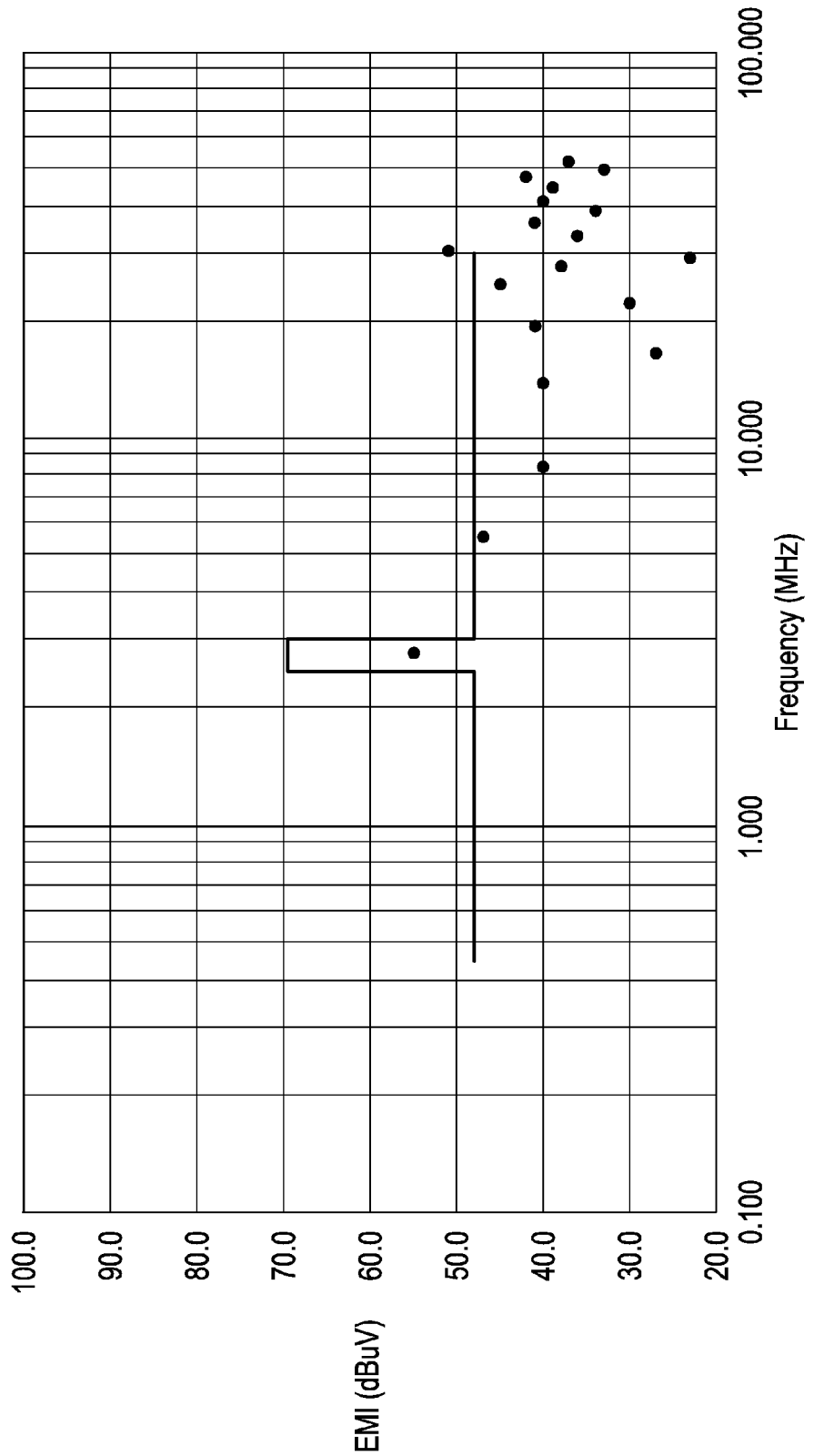
FIG. 16 provides experimental data of conductive EMI (points) and the allowed limits (lines) taken with the test lamp accordance to an exemplary and non-limiting embodiment.

FIGS. 15 and 16 show the FCC Part 18 limit line on plots of measured data for the two lamps. The horizontal axes are frequency in MHz and the vertical axes are the amplitudes of the measured EMI on a log scale in units of dBuV, or dB above 1 uV. The construction of couplers impacts the response vs. frequency, and the two different couplers were not expected to have identical EMI patterns vs. frequency. What is important is that both couplers have relatively low EMI that is capable of complying with the FCC's technical limits for Part 18 EMI. Although not shown, couplers without EMI reducing features will exceed the FCC's limits considerably. The main operating frequency of the electronic circuit powering the coupler is near a frequency of 2.75 MHz. As shown there is a "chimney" on the limit line between 2.51 and 3.0 MHz. where increased EMI is allowed. It should be noted that in this chimney, the generated EMI could be quite large. Exemplary embodiments lower the EMI in this chimney, as shown in FIG. 16 relative to that shown in FIG. 15.

The results of different steps discussed above were separately tested on this set-up, and confirmed for their effectiveness. When these steps were incorporated together in the final RF lamp embodiment, its EMI level was similar to that of the commercial lamp, and both were considerably lower than the regulation threshold. Thus, the measured values of the lamp surface voltage, for the newly invented lamp and commercial one were 0.58 V and 0.48 V peak-to-peak respectively, values well under the required limitations from the FCC for conductive EMI.

Figure 12A:
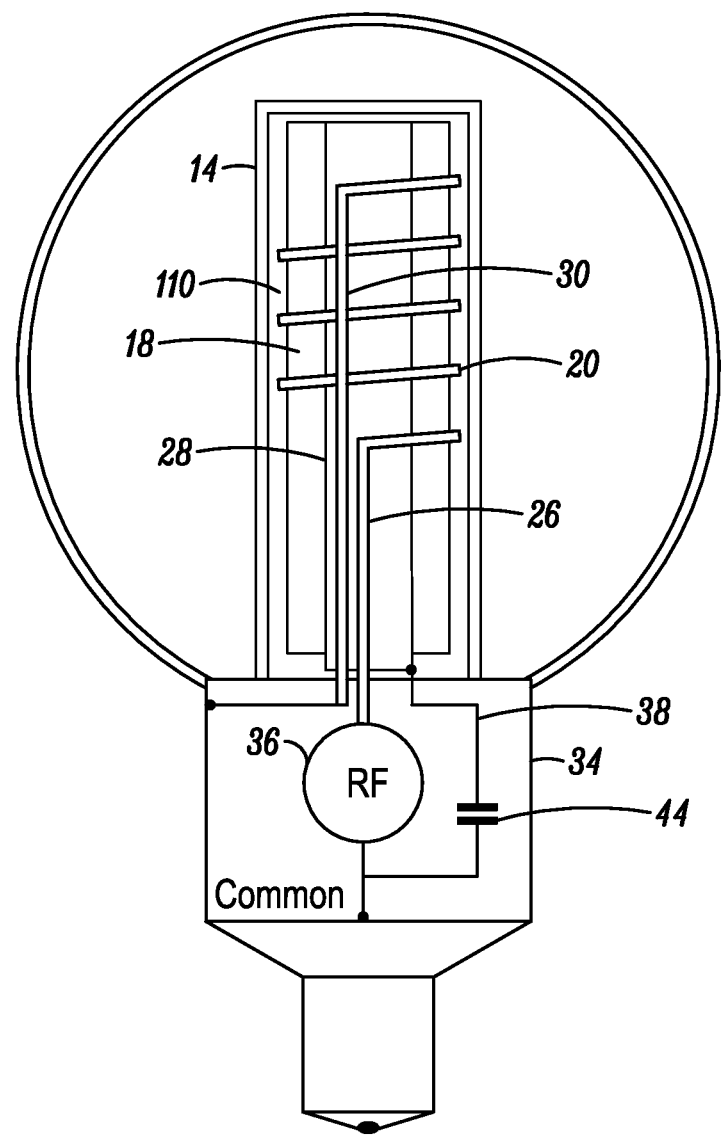
FIG. 12A depicts an exemplary embodiment of a capacitor acting to provide electrical isolation from a ferrite core coupler.
Figure 12B:
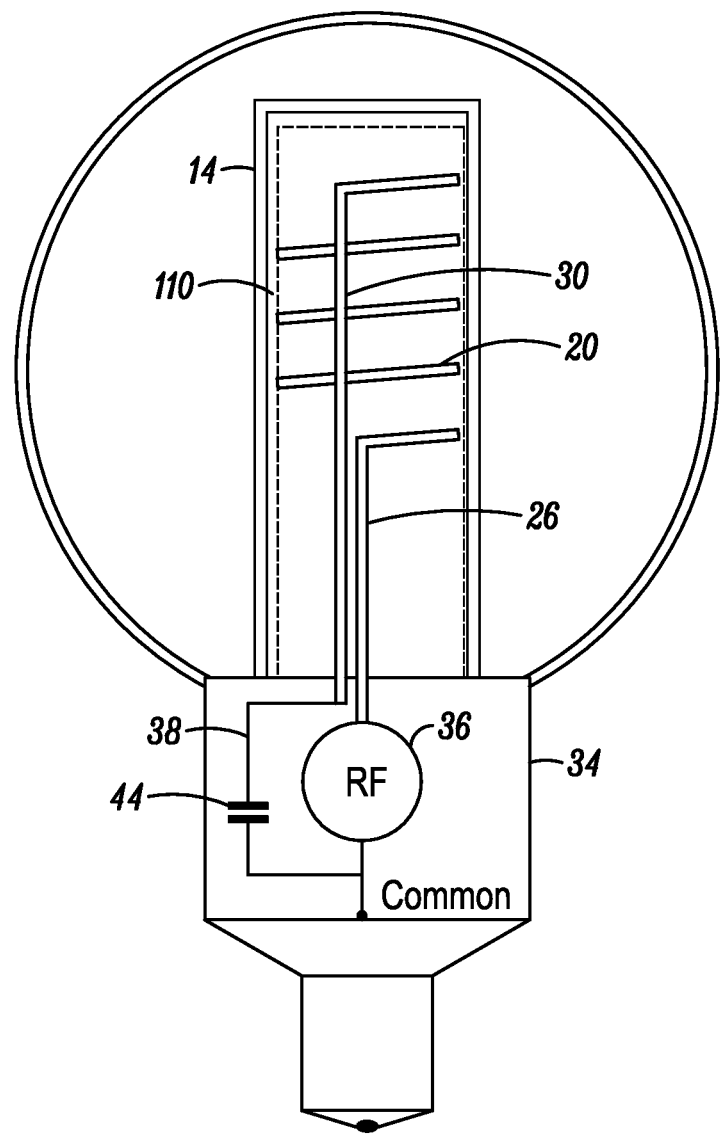
FIG. 12B depicts an exemplary embodiment of a capacitor acting to provide electrical isolation from an air-core coupler

Referring to FIGS. 12A and 12B, in certain situations it may be desirable to connect the coupler 110 to RF ground through a capacitor 44 that has a low impedance at the operating frequency of the lamp, but a high impedance at the frequency of the AC power line. This would prevent electrical shock if a human came in contact with an exposed coupler 110 while the lamp was connected to an AC power line, even if the high frequency converter in the ballast was not operating. The term "RF ground" is understood to mean any node of the ballast that has a low RF potential with respect to the circuit common node. In a typical ballast, both the circuit common, which is typically the negative DC bus, and the positive DC bus, are RF ground nodes. Referring to FIG. 12A, in embodiments, the coupler 110 may include a ferromagnetic core 18, and the connection of the capacitor 44 may be made to the coupler 110 or to any component associated with the coupler 110, such as a ferromagnetic core, a conductive foil or shell inserted within or around the core, and the like. Referring to FIG. 12B, in embodiments, the coupler 110 may include an air-core, and the connection of the capacitor 44 may be made to the coupler 110, such as directly to the winding return 30, and the like. In embodiments, there may be two capacitors connected to the winding, such as one capacitor connected at one location (e.g. at a first end of the winding) and a second capacitor connected at a second location (e.g. at the second end of the winding). The coupler 110 of FIG. 12B is shown with a dotted line to indicate, as described herein, that an air-core coupler may optionally include a non-magnetic and non-conductive supporting material, such as a plastic form, to support the conductor coil, or, if the coil is self-supporting, with no additional support at all.

The potential for electrical shock may arise when an electronic circuit is powered from an AC power line by means of a full wave bridge rectifier because the magnitude of the voltage difference between the positive output terminal of the full wave bridge rectifier, which is normally connected to the positive DC bus of the high frequency converter, and each of the two AC power lines will periodically be equal to the peak of the AC input voltage between those two power lines. In like manner, the magnitude of the voltage difference between the negative output terminal of the full wave bridge rectifier, which is normally connected to the negative DC bus of the converter, often labeled circuit common, and each of the two AC power lines will also periodically be equal to the peak of the AC input voltage between those two power lines. Due to this characteristic of circuits powered from AC power lines through full wave bridge rectifiers, the potential for electric shock exists if users are allowed to come in contact with circuit common or other node of the circuit that does not have a high impedance to circuit common at a frequency of 60 Hz. For instance, and without limitation, if the conductive foil shell 28 shown in FIG. 11 is connected directly to any point in the ballast circuit, a potential for electrical shock is created if users come in contact with the ferrite core 18 of coupler 110.

In order to remove such a shock hazard, the low resistance connection between the coupler 110 and ballast circuitry should be removed and replaced with a capacitor 44 that has a low impedance at the operating frequency of the lamp and a high impedance at the power line frequency.

In a non-limiting example, and referring to FIG. 12A, for a lamp operating frequency of 2.65 MHz with a ferromagnetic core with conductive foil shell inserted, and operated from a 60 Hz power line, the isolation capacitor should have a value between 0.6 nF and 13 nF, where we want the 60 Hz leakage current from the ferrite core 18 to earth ground be no greater than 1 mA, and the magnitude of the impedance from the conductive foil shell to circuit common, or to the positive DC bus, at the lamp operating frequency of 2.65 MHz to be no higher than 100 Ohms. The magnitude of the impedance of a 0.6 nF capacitor is 100 Ohms at 2.65 MHz and 4.4 Meg Ohms at 60 Hz. The magnitude of the impedance of an 11 nF capacitor is 4.62 Ohms at 2.65 MHz and 200 K Ohms at 60 Hz. Different capacitor values can be used if these boundary conditions are relaxed.

In a different non-limiting example, and referring to FIG. 12B, for a lamp operating frequency of about 27 MHz with an air-core coupler, and operated from a 60 Hz power line, the isolation capacitor should have a value between 60 pF and 13 nF, where we want the 60 Hz leakage current from the coupler 110 to earth ground be no greater than 1 mA, and the magnitude of the impedance from the coupler to circuit common, or to the positive DC bus, at the lamp operating frequency of about 27 MHz to be no higher than 100 Ohms. The magnitude of the impedance of a 60 pF capacitor is 98 Ohms at 27 MHz and 44 Meg Ohms at 60 Hz. The magnitude of the impedance of an 11 nF capacitor is 0.453 Ohms at 27 MHz and 200 K Ohms at 60 Hz. Different capacitor values can be used if these boundary conditions are relaxed.

Optics

In embodiments, optical coatings may be used to optimize the performance of the induction lamp, such as to maximize visible light emitted, minimize light absorbed by the power coupler, and the like. Optical coatings may at least partially reflect, refract, and diffuse light. For instance, a reflection coating may be used to reflect light impinging on the re-entrant cavity back into the burner, as otherwise that light may be absorbed by the coupler and thus not converted to visible light emitted to the external environment. Further, light absorbed by the coupler may contribute unwanted heat to the coupler, thus affecting its performance, life, and the like. In another instance, optical coatings may be used on the outside envelop of the burner, such as between the phosphor coating and the glass, where this optical coating may enhance the transfer of light through the glass, such as though index matching. Further, the coating may be used to help decrease absorption of the mercury into or onto the glass envelope. Optical coatings may also be used to create or enhance aesthetic aspects of the induction lamp, such as to create an appearance for the lower portion of the induction lamp to substantially look like the glass upper portion of the induction lamp. In embodiments, coatings on the upper and lower portions of the induction lamp may be applied so as to minimize the difference in the outward appearance of the upper and lower portions of the induction lamp, such as to minimize the differences in the outward appearance of the induction lamp to that of a traditional incandescent lamp, thus creating a more familiar device to the consumer along with a resulting increase in usage acceptance with respect to being used for replacement of incandescent lamps.

In embodiments, optical components may be provided to enhance a lighting property of the induction lamp. Optical components may include reflectors, lenses, diffusers, and the like. Lighting properties affected by optical components may include directionality, intensity, quality (e.g. as perceived as 'hard' or 'soft'), spectral profile, and the like. Optical components may be integrated with the induction lamp, included in a lighting fixture that houses the induction lamp, and the like. For instance, reflectors and lenses may be used in a lighting fixture in conjunction with the induction lamp to accommodate a lighting application, such as directional down lighting, omnidirectional lighting, pathway lighting, and the like. In an example, a lighting fixture may be created for a directional down light application, where reflectors proximate to the sides of the induction light direct side light from the induction lamp to a downward direction, where a lens may further direct the light reflected from the reflected side light and directly from the induction lamp within a desired downward solid angle.

Electronic Ballast Having Improved Power Factor and Total Harmonic Distortion

Figure 17:
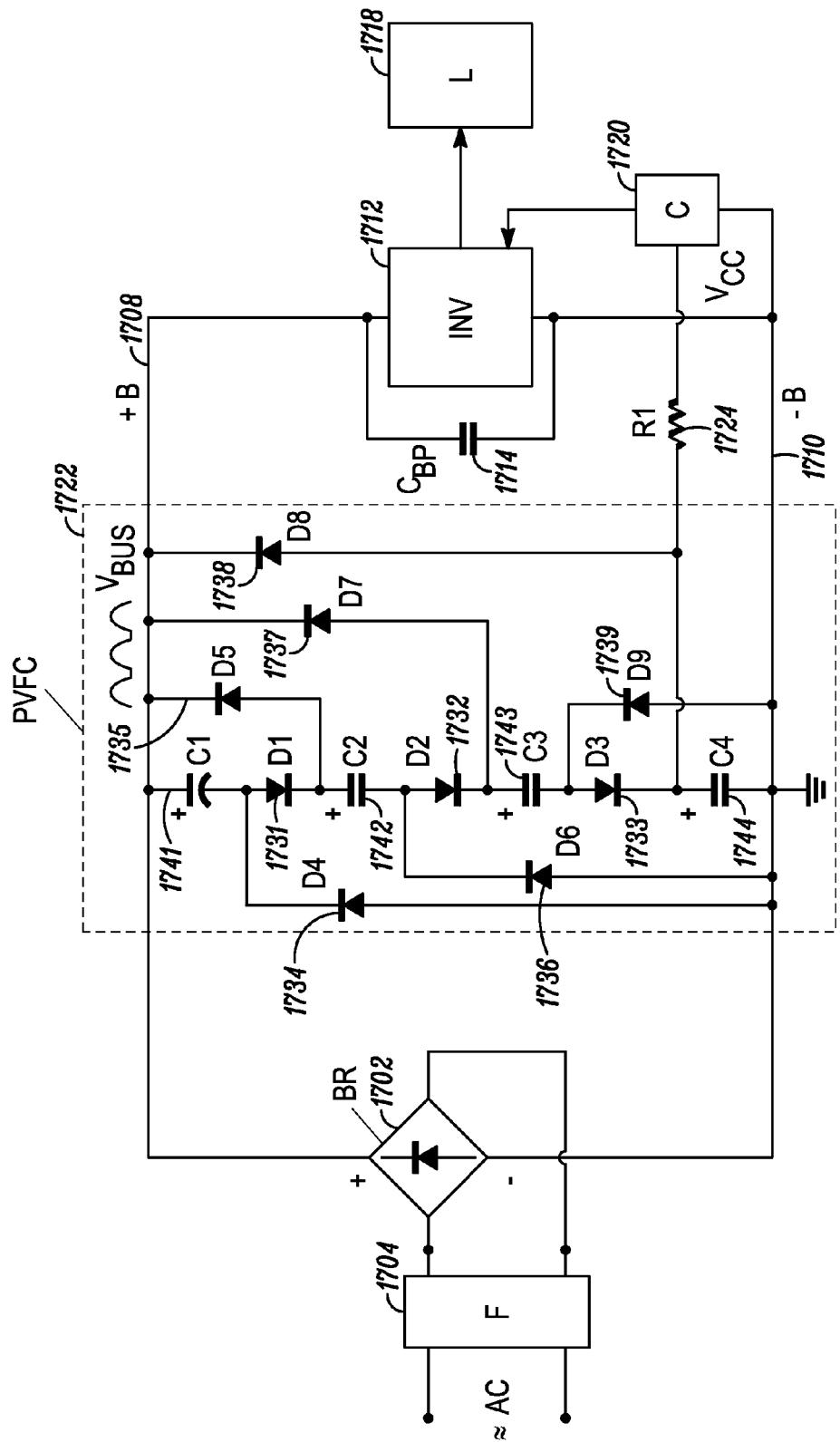
FIG. 17 shows a block-circuit diagram of electronic ballast comprising a Passive Valley Fill PF correction circuit accordingly to the present invention.

In embodiments, as shown in FIG. 17, a source of AC voltage 120V, 60 Hz is applied to the full wave bridge rectifier BR 1702 via EMI filter F 1704, the DC output voltage of BR is applied directly between the positive rail +B 1708 and negative rail −B 1710 of the DC bus which is coupled to the output of BR. There is no traditional energy-storage electrolytic capacitor across DC bus. A DC backup voltage generated by the Passive Valley Fill Circuit (PVFC) 1722 is superposed on the rectified voltage and results in Vbus voltage for powering a high frequency resonant inverter INV 1712. A small bypass capacitor Cbp 1714 is connected to the input of the DC inverter to smooth out high frequency voltage ripple generated by the resonant inverter INV. The resonant inverter INV powers a fluorescent lamp 1718. Multiple lamps may be powered from a single inverter INV (not shown in FIG. 17). The inverter INV may have a control circuitry C 1720 for driving power stages and other needs. This circuitry needs an auxiliary power supply. In FIG. 17 the auxiliary power is obtained from the 4-capacitor 9-diode (4C9D) PVFC via a resistor R1 1724. The PVFC is a network built with four small capacitors, each having a voltage rating substantially below the voltage of the DC bus, and 9 diodes for generating a backup DC voltage that is about $\frac{1}{4}^{th}$ of the peak rectified voltage. For a 120V AC line this DC voltage will be about 40V. This voltage is sufficient to support continuous lamp operation. The PVFC comprises first, second, third, and fourth capacitors, designated C1 1741, C2 1742, C3 1743, and C4 1744, each having a positive terminal designated as "+" and also having a negative terminal. These capacitors are connected in series via first, second and third charge diodes designated as D1 1731, D2 1732, and D3 1733, each having an anode and a cathode. The diodes D1, D2, and D3 allow capacitors C1, C2, C3 and C4 to charge in series, but prevent those same capacitors C1, C2, C3, and C4 from discharging in series. Passive Valley Fill Circuit PVFC also comprises fourth, fifth, sixth, seventh, eighth and ninth discharge diodes designated in FIGS. 17 as D4 1734, D5 1735, D6 1736, D7 1737, D8 1738, and D9 1739, each having an anode and a cathode. These discharge diodes provide parallel discharge paths to the DC bus for capacitor C1, C2, C3, and C4. The first charge capacitor C1 has its positive terminal connected to DC bus positive rail +B and has its negative terminal connected to the anode of the first diode D1. The second capacitor C2 has its positive terminal connected to the cathode of the first diode D1 and its negative terminal connected to the anode of the second diode D2. The third capacitor C3 has its positive terminal connected to the cathode of the second diode D2 and its negative terminal connected to the anode of the third diode D3. The fourth capacitor C4 has its positive terminal connected to the cathode of the third diode D3 and its negative terminal connected to the DC bus negative rail, −B. The cathode of the forth diode D4 is connected to the negative terminal of the first capacitor, C1, and its anode is connected to DC bus negative rail −B. The cathode of the fifth diode D5 is connected to the DC bus positive rail, +B, and its anode is connected to the positive terminal of the second capacitor C2. The cathode of the sixth diode D6 is connected to the negative terminal of the second capacitor C2 and its anode is connected to the DC bus negative rail −B.

The anode of the seventh diode D7 is connected to the positive terminal of the third capacitor C3 and its cathode connected to the DC bus positive rail, +B. The anode of the eighth diode D8 is connected to the positive terminal of the fourth capacitor C4 and its cathode is connected to the DC bus positive rail, +B. The anode of the ninth diode D9 is connected to the DC bus negative rail −B and its cathode is connected to the negative terminal of the third capacitor C3.

Figure 19:
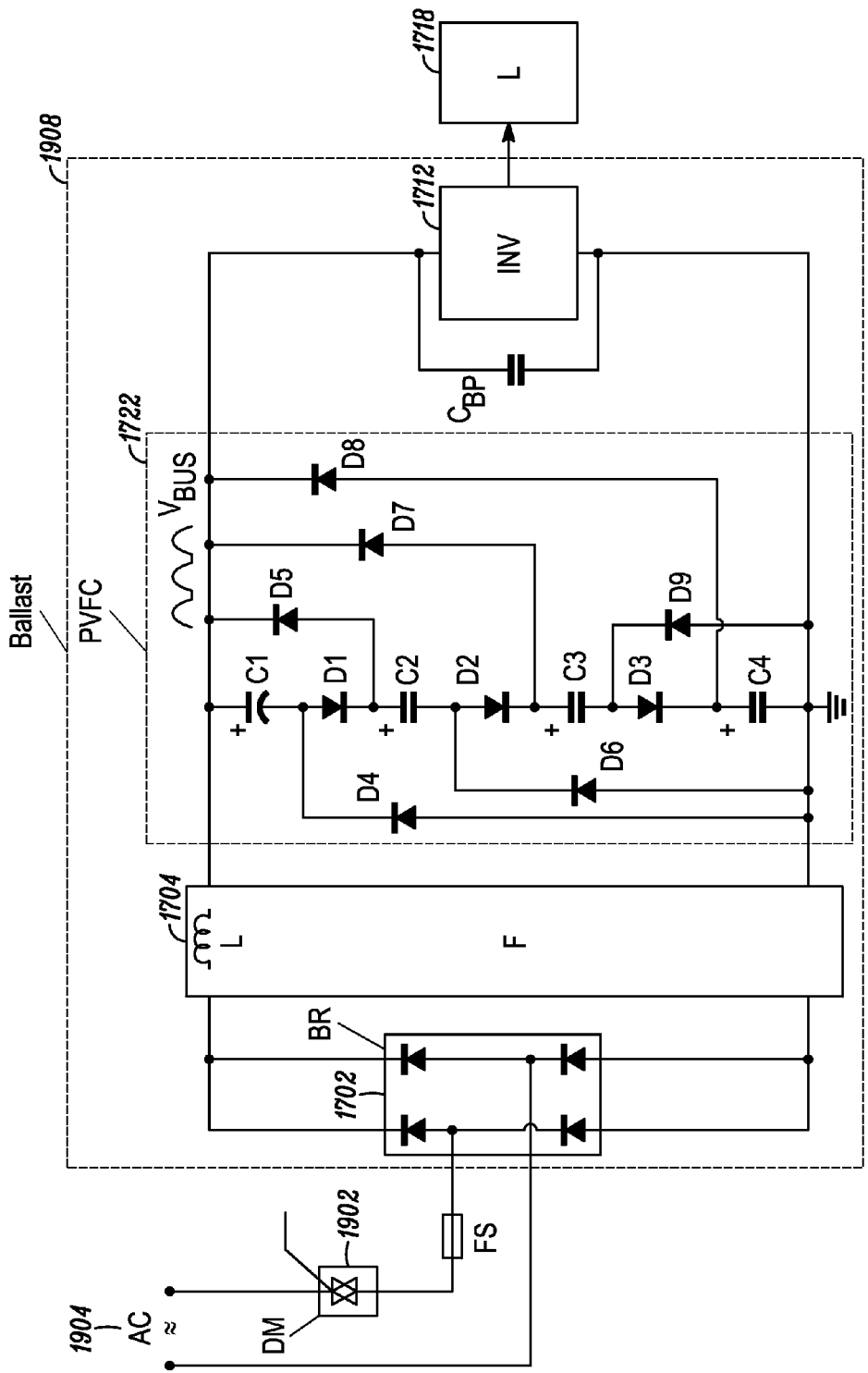
FIG. 19 shows a block-circuit diagram of electronic ballast with a Passive Valley Fill Circuit dimmed by TRIAC based dimmer.

In embodiments, as illustrated in FIG. 19, the 4C9D PVFC 1722 (comprising C1 1741, C2 1742, C3 1743, C4 1744, D1 1731, D2 1732, D3 1733, D4 1734, D5 1735, D6 1736, D7 1737, D8 1738, and D9 1739) is utilized in combination with a TRIAC dimmer DM 1902, which is connected between the AC line 1904 and the input of the ballast 1908. The special features of the 4C9D PVFC is that this circuit eliminates interruptions of current flow from the AC line that cause flicker in the lamp.

With reference to FIG. 17, the operation of the ballast 1908 may be explained as follows. When the AC switch (not shown) is turned "on", AC power is applied directly to the bridge rectifier BR 1702. There is no traditional electrolytic capacitor at the output of the rectifier, so that the inverter INV 1712 is powered from unsmoothed rectified voltage. However, the inverter INV may provide a significant lamp starting voltage when the DC bus voltage is near the peak of the AC line voltage and thereby start the lamp 1718 for at least 1-2 msec. Series capacitors C1-C4 are charged from the DC bus directly through diodes D1 to D3. Inrush current is limited by the impedance of EMI filter F 1704 and series resistance of the series capacitors C1-C4. In a quarter of the power line voltage cycle, each of capacitors C1 to C4 is charged to a DC voltage that is about of ¼th of AC peak voltage (40V DC at 120V AC power line). Current to the inverter INV will be provided either from the AC line or from capacitors C1-C4 when they discharge in parallel, depending on which of the instantaneous voltages is higher. When the instantaneous AC line voltage is above 40-45V, current will be drawn from the AC line. The current conduction angle in the bridge rectifier BR of the ballast is higher than in prior art Passive Valley Fill circuits.

Figure 18:
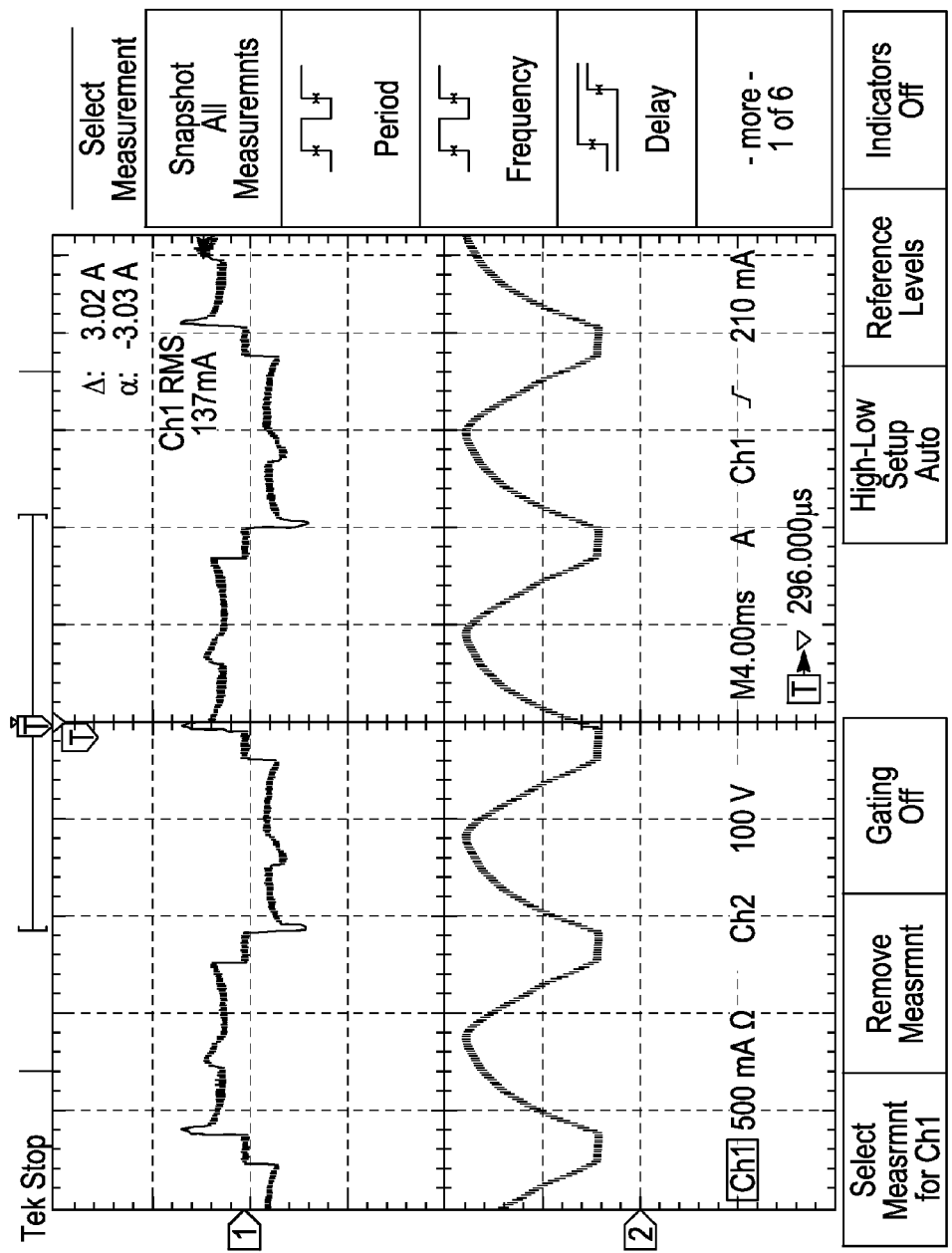
FIG. 18 shows waveforms of the input current and DC bus voltage of the ballast in FIG. 17.

FIG. 18 demonstrates actual oscillograms of the input AC line current and DC bus voltage in the ballast circuit of FIG. 17 after starting in steady-state mode. A power factor PF=0.96-097 can be achieved for ballasts driving gas discharge lamps.

Figure 20:
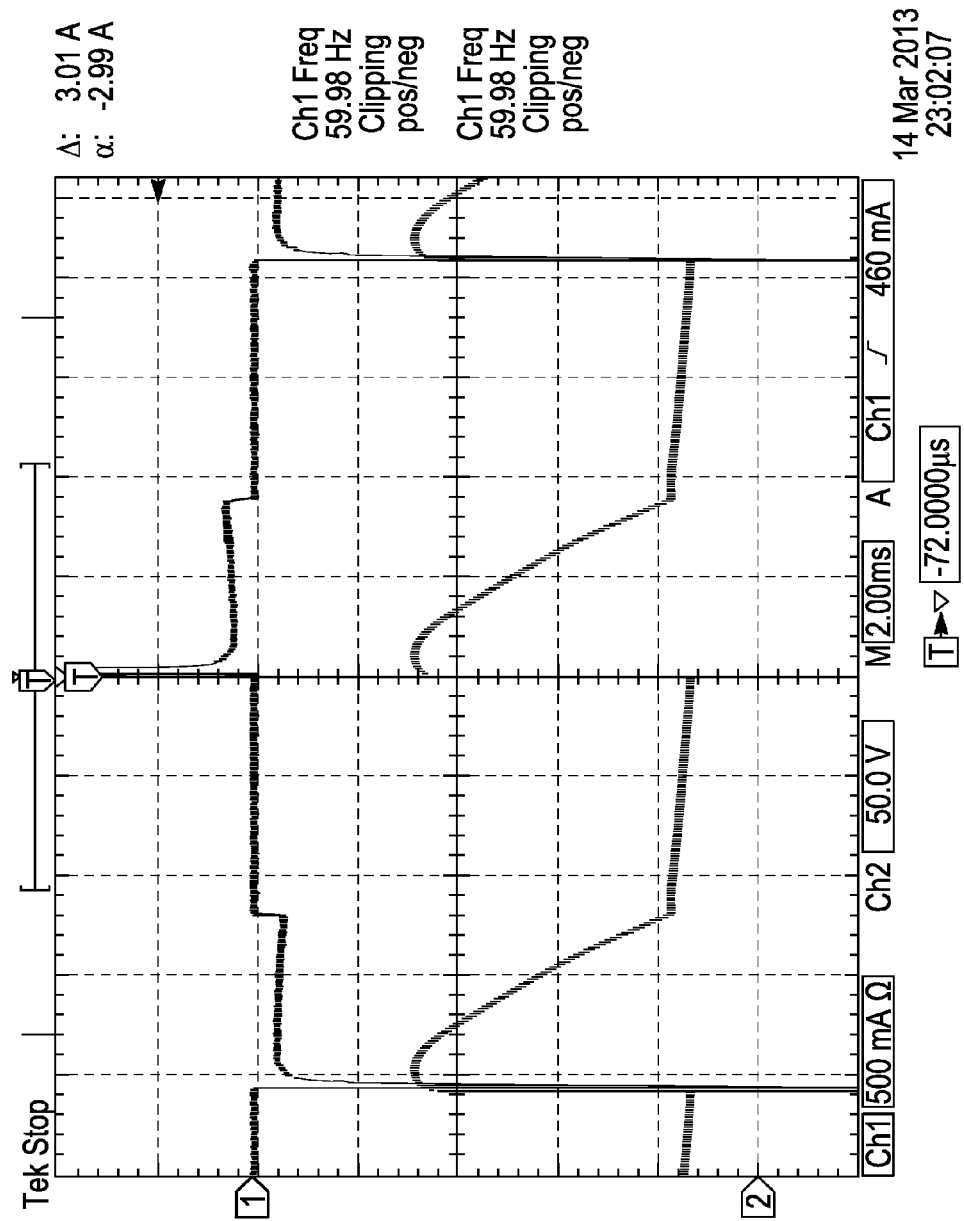
FIG. 20 shows waveforms of the input current and DC bus voltage of the ballast in FIG. 19.

Referring to FIG. 19, a system is provided that includes an electronic ballast with the 4C9D PVFC and TRIAC dimmer (such as a wall dimmer) placed in between the power line and the input terminal of the ballast. When the dimmer TRIAC turns on, all four capacitors C1-C4 are charged in series. Therefore, in the absence of an electrolytic capacitor directly connected to the DC bus, the inverter INV consumption current provides for the TRIAC holding current. This current can satisfy a commercial dimmer to keep it in the "on" position. Thus, light flickering caused by turning on and off the dimmer TRIAC is avoided. When the instant AC voltage becomes lower than the capacitor voltage, the Bridge Rectifier BR is backed up and the inverter INV is supplied by discharge current of capacitors C1-C4. The TRIAC loses its holding current and automatically turns off until the next half period. But the gas discharge in the lamp continues at a reduced power, so that with new pulses coming from the dimmer, the lamp does not need to restart. FIG. 20 demonstrates input AC current and DC bus voltage waveforms with the TRIAC dimmer at 50% "on". The system in FIG. 19 features a wider dimming range than prior art ballasts. For 16-20 W gas discharge lamps, 22 uV, 63V capacitors values for C1-C4 may provide a dimming range down to approximately 10%. Diodes D1-D9 may be selected to be the same type. Small signal diodes and diode arrays may be used for cost and space saving.

While only a few embodiments of the present invention have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

All documents referenced herein are hereby incorporated by reference.

What is claimed is:

1. An induction RF fluorescent lamp, comprising:
a lamp envelope with a re-entrant cavity both covered on a partial vacuum side with phosphor and filled with a working gas mixture;
an air-core power coupler on the non-vacuum side of said re-entrant cavity comprising a coil composed of at least one turn of an electrical conductor;
an electronic ballast, wherein the ballast converts mains frequency voltage and current to a power coupler frequency voltage and current, the electronic ballast providing the voltage and current to the power coupler through at least two of a plurality of electrical terminals of the electronic ballast; and
a capacitor electrically connected between the air-core power coupler and at least one of the plurality of electrical terminals of the electronic ballast, wherein the magnitude of the impedance of the capacitor is high at the mains frequency and the magnitude of the impedance of that same capacitor is low at the operating frequency of the RF fluorescent lamp.

2. The lamp of claim 1, wherein the connection of the capacitor between the air-core power coupler and the at least one of the plurality of electrical terminals of the electric ballast is between a first location on the coil of the air-core power coupler and at least one of the plurality of electrical terminals of the electronic ballast.

3. The lamp of claim 2, further comprising a second capacitor, wherein the second capacitor is electrically connected between a second location on the coil of the air-core power coupler and a second of the plurality of electrical terminals of the electronic ballast, wherein the magnitude of the impedance of the second capacitor is high at the mains frequency and the magnitude of the impedance of that same second capacitor is low at the operating frequency of the RF fluorescent lamp.

4. The lamp of claim 1, wherein the at least one of the plurality of electrical terminals is a common or reference for the electronic ballast.

5. The lamp of claim 1, wherein the at least one of the plurality of electrical terminals is a DC bus for the electronic ballast.

6. The lamp of claim 1, wherein the presence of the capacitor reduces the risk of electrical shock when a person has direct contact with the air-core power coupler.

7. The lamp of claim 1, wherein the lamp is electrically connected to mains power without electrical isolation.

8. The lamp of claim 1, wherein the low magnitude for the impedance of the capacitor at the operating frequency of the RF fluorescent lamp is equal to or less than 100 ohms.

9. The lamp of claim 1, wherein the operating frequency of the RF fluorescent lamp is in the range 1 MHz to 1 GHz 10. The lamp of claim 1, wherein mains frequency is in the range of 50 Hz to 60 Hz.

11. The lamp of claim 1, wherein the value of the capacitor is in the range of 60 pF to 13 nF at a mains frequency of 60 Hz and a ballast operating frequency of 27 MHz.

12. The lamp of claim 1, wherein the electrical conductor is at least one of an electrically conductive wire and electrically conductive strip.

* * * * *